United States Patent
Hirabayashi

(10) Patent No.: US 9,274,704 B2
(45) Date of Patent: Mar. 1, 2016

(54) ELECTRONIC APPARATUS, METHOD AND STORAGE MEDIUM

(71) Applicant: Kabushiki Kaisha Toshiba, Minato-ku, Tokyo (JP)

(72) Inventor: Hirotada Hirabayashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/268,777

(22) Filed: May 2, 2014

(65) Prior Publication Data

US 2015/0035765 A1 Feb. 5, 2015

Related U.S. Application Data

(63) Continuation of application No. PCT/JP2013/071041, filed on Aug. 2, 2013.

(51) Int. Cl.
  *G06F 3/041* (2006.01)
  *G06F 3/0488* (2013.01)
  *G06K 9/00* (2006.01)
  *G06K 9/22* (2006.01)

(52) U.S. Cl.
  CPC ........ *G06F 3/04883* (2013.01); *G06K 9/00436* (2013.01); *G06K 9/222* (2013.01)

(58) Field of Classification Search
  CPC .. G06F 3/04883; G06K 9/00436; G06F 9/222
  USPC ....................................................... 345/173
  See application file for complete search history.

(56) References Cited

U.S. PATENT DOCUMENTS

| 5,698,822 A | 12/1997 | Haneda et al. |
| 2005/0249419 A1 | 11/2005 | Rieman |
| 2009/0226091 A1 | 9/2009 | Goldsmith et al. |
| 2011/0040908 A1 | 2/2011 | Ikeda et al. |
| 2012/0139859 A1 | 6/2012 | Ohira et al. |
| 2012/0299701 A1 | 11/2012 | Zou |
| 2015/0135065 A1 | 5/2015 | Hirabayashi et al. |

(Continued)

FOREIGN PATENT DOCUMENTS

| JP | 06-251187 A | 9/1994 |
| JP | 07-121662 A | 5/1995 |

(Continued)

OTHER PUBLICATIONS

U.S. Appl. No. 14/547,999, filed Nov. 19, 2014, Hirabayashi.

(Continued)

*Primary Examiner* — Gustavo Polo
(74) *Attorney, Agent, or Firm* — Knobbe, Martens Olson & Bear LLP

(57) ABSTRACT

According to one embodiment, a method includes receiving, by an electronic apparatus, first stroke data corresponding to a first handwritten stroke and if the first stroke data is received, displaying on a screen a first candidate of a first character string corresponding to a first query of the first handwritten stroke, wherein if second stroke data corresponding to a second handwritten stroke is received continuously after a reception of the first stroke data, and if the first candidate is different from a second candidate of a second character string corresponding to a second query of both the first stroke data and the second stroke data, the second candidate is displayed on the screen with higher priority than the first candidate.

15 Claims, 18 Drawing Sheets

(56) References Cited

U.S. PATENT DOCUMENTS

| | | |
|---|---|---|
| 2015/0242114 A1 | 8/2015 | Hirabayashi et al. |
| 2015/0278216 A1 | 10/2015 | Hirabayashi |

FOREIGN PATENT DOCUMENTS

| | | | |
|---|---|---|---|
| JP | 07-311817 A | 11/1995 | |
| JP | 09-120433 A | 5/1997 | |
| JP | 09-319504 A | 12/1997 | |
| JP | 10-171589 A | 6/1998 | |
| JP | 2000-187658 A | 7/2000 | |
| JP | 2000-215270 A | 8/2000 | |
| JP | 2000-348141 A | 12/2000 | |
| JP | 2005-025566 A | 1/2005 | |
| JP | 2005-190199 A | 7/2005 | |
| JP | 2007-213416 A | 8/2007 | |
| JP | 2007-265171 A | 10/2007 | |
| JP | 2008-186056 A | 8/2008 | |
| JP | 2009-146273 A | 7/2009 | |
| JP | 2009-223430 A | 10/2009 | |
| JP | 2012-098891 A | 5/2012 | |
| WO | WO 2005/004041 A1 | 1/2005 | |
| WO | WO 2007/094078 A1 | 8/2007 | |
| WO | WO 2011/079417 A1 | 7/2011 | |
| WO | WO 2015/015644 A1 | 2/2015 | |

OTHER PUBLICATIONS

English translation of International Search Report mailed by Japan Patent Office on Aug. 27, 2013 in the corresponding PCT application No. PCT/JP2013/071041—5 pages.

Decision of Rejection mailed by Japan Patent Office on Feb. 17, 2015 in the corresponding Japanese patent application No. 2013-544612—6 pages.

The extended European search report issued by European Patent Office on Mar. 13, 2015 in the European patent application No. 14166091.0—9 pages.

International Search Report mailed by Japan Patent Office on Aug. 27, 2013 in the corresponding PCT application No. PCT/JP2013/071041—9 pages.

First Office Action mailed by Japan Patent Office on Sep. 9, 2014 in the corresponding Japanese patent application No. 2013-544612—7 pages.

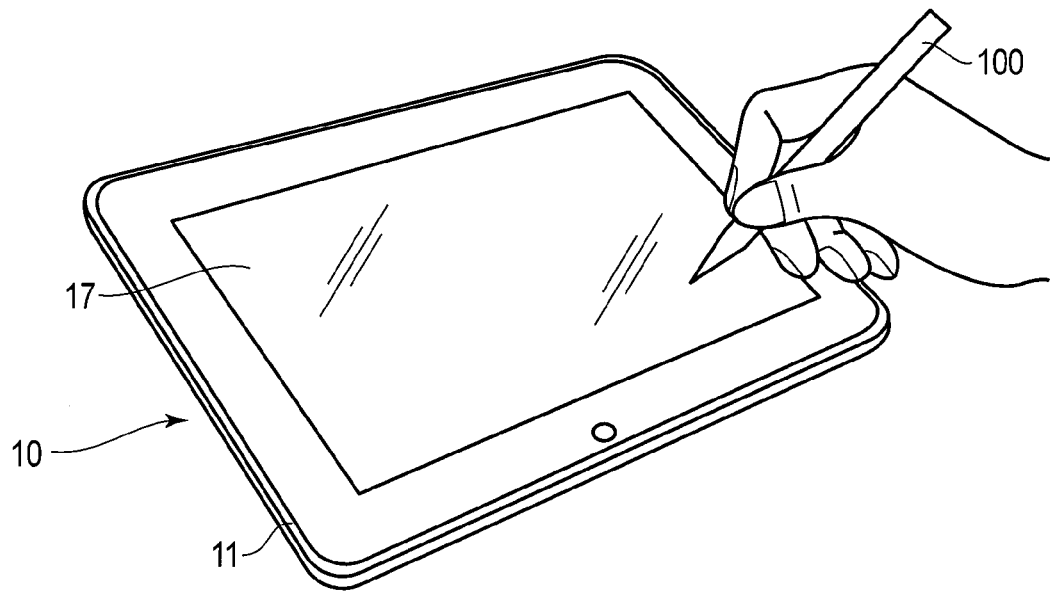
F I G. 1
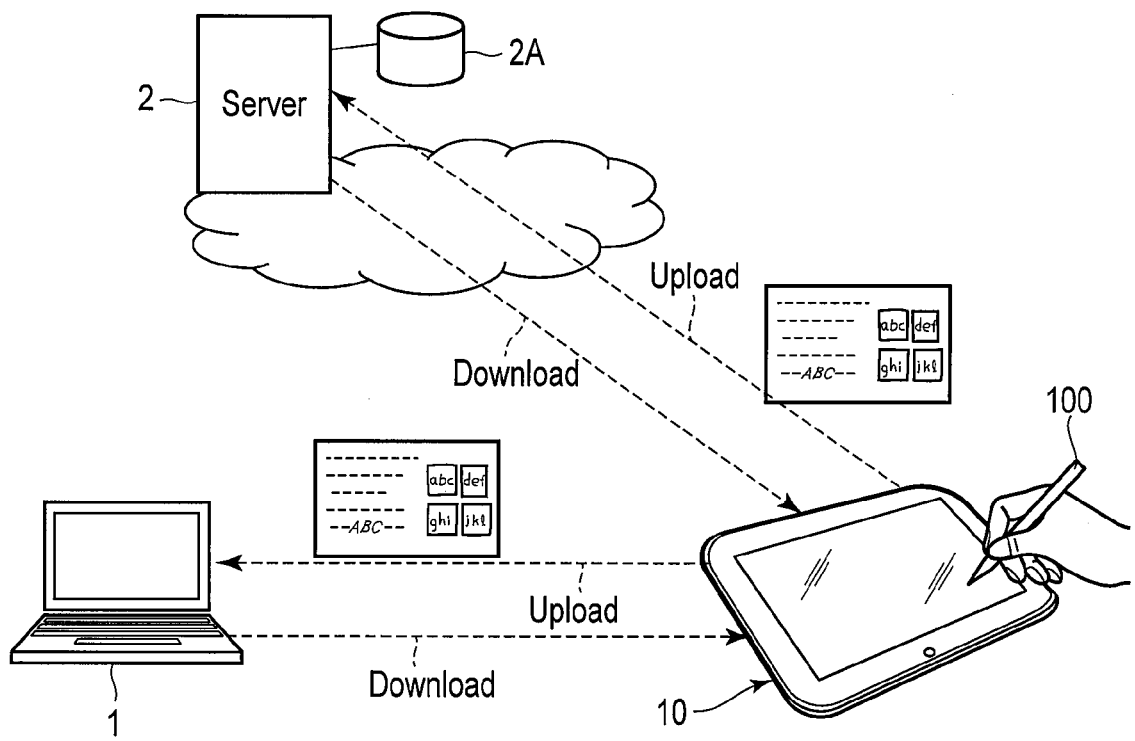
F I G. 2

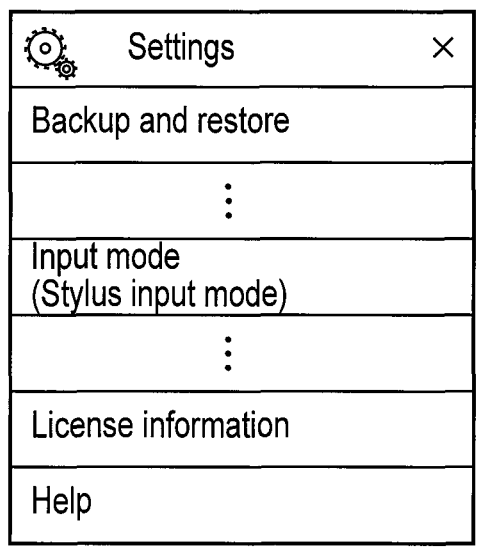
F I G. 8

| Keywords | Character recognition results | Stroke counts |
|---|---|---|
| . . . | . . . | . . . |
| application | a | 1 |
| application | ap | 2 |
| application | app | 3 |
| application | appl | 4 |
| application | appl- | 5 |
| application | appli | 6 |
| application | applic | 7 |
| . . . | . . . | . . . |

FIG. 12

| Keywords | Stroke data | Appearance frequencies | Selection counts |
|---|---|---|---|
| . . . | . . . | . . . | . . . |
| app | (10,10)-(13,8)- . . . | 5 | 3 |
| apple | . . . | . . . | . . . |
| application | . . . | . . . | . . . |
| approve | . . . | . . . | . . . |
| aps | . . . | . . . | . . . |
| . . . | . . . | . . . | . . . |

FIG. 13

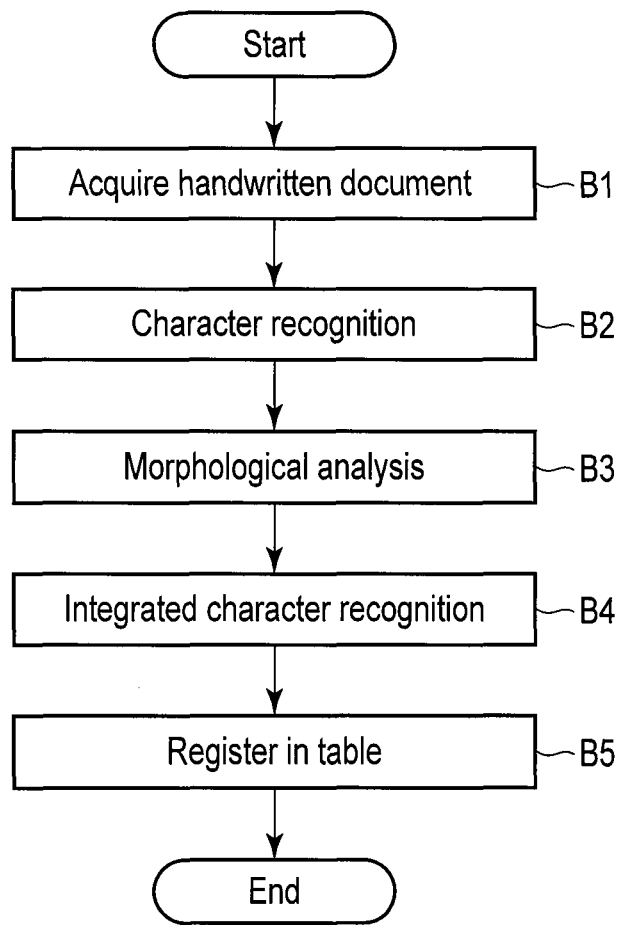
F I G. 14

| Stroke count | | 1 | 2 | 3 | 4 | 5 |
|---|---|---|---|---|---|---|
| Character recognition results | | a | as | app | appl | apple |
| Keywords | | apple | asterisk | apple | apple | apple |
| | | approve | | approve | application | apple |
| | | application | | application | | |
| Rank 1 | | apple [1] | asterisk [2] | apple [4] | apple [8] | apple [13] |
| Rank 2 | | approve [1] | apple [1] | approve [4] | application [8] | application [8] |
| Rank 3 | | application [1] | approve [1] | application [4] | approve [4] | approve [4] |
| Rank 4 | | | application [1] | asterisk [2] | asterisk [2] | asterisk [2] |

F I G. 17

ELECTRONIC APPARATUS, METHOD AND STORAGE MEDIUM

CROSS-REFERENCE TO RELATED APPLICATIONS

This application is a Continuation application of PCT Application No. PCT/JP2013/071041, filed Aug. 2, 2013, the entire contents of which are incorporated herein by reference.

FIELD

Embodiments described herein relate generally to technology of inputting character strings by handwriting.

BACKGROUND

Recently, various electronic apparatuses including a tablet, a PDA, and a smartphone have been developed. Most of the electronic apparatuses of these types include a touchscreen display to facilitate a user input operation.

By touching a menu or an object displayed on a touchscreen display with a finger or the like, the user can instruct an electronic apparatus to execute a function related to the menu or object.

An input operation using the touchscreen display is employed for not only providing the electronic apparatus with the instruction of operation, but also inputting a document by handwriting. Recently, the user can bring the electronic apparatuses of these types when attending a meeting and the like. At the meeting and the like, the user can create a handwritten document such as a note by handwriting input on the touch screen display.

Furthermore, on some of the electronic apparatuses of these types, the handwritten document created as mentioned above can be searched by inputting a character string (hereinafter called a search character string) as a search query (search key) by handwriting on the touchscreen display.

However, much labor is required for inputting all character strings (for example, words and the like) by handwriting.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view showing an example of an appearance of an electronic apparatus according to an embodiment;

FIG. 2 is a block diagram showing an example of cooperation between the electronic apparatus and the other apparatuses;

FIG. 8 is an illustration showing an example of a setting screen displayed by the electronic apparatus;

FIG. 12 is a table showing an example of a data structure of a suggest feature table;

FIG. 13 is a table showing an example of a data structure of a suggest keyword table;

FIG. 14 is a flowchart showing an example of feature amount registration;

FIG. 17 is a illustration for explaining an example of ranking of keywords;

DETAILED DESCRIPTION

Figure 3:
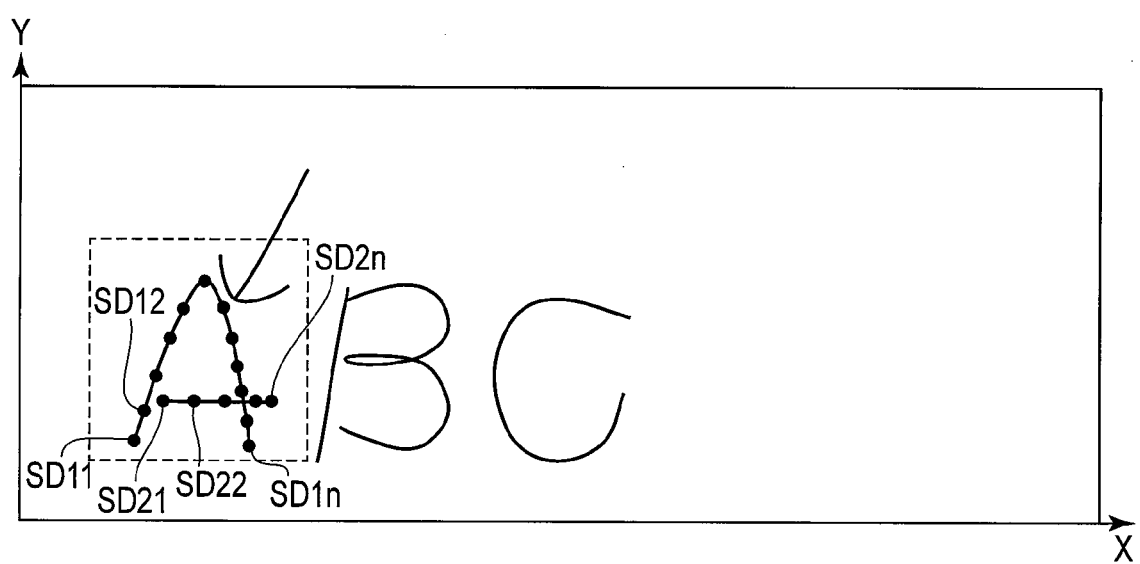
FIG. 3 is an illustration showing an example of a document handwritten on a touchscreen display.

Various embodiments will be described hereinafter with reference to the accompanying drawings.

In general, according to one embodiment, a method includes receiving, by an electronic apparatus, first stroke data corresponding to a first handwritten stroke and if the first stroke data is received, displaying on a screen a first candidate of a first character string corresponding to a first query of the first handwritten stroke, wherein if second stroke data corresponding to a second handwritten stroke is received continuously after a reception of the first stroke data, and if the first candidate is different from a second candidate of a second character string corresponding to a second query of both the first stroke data and the second stroke data, the second candidate is displayed on the screen with higher priority than the first candidate.

FIG. 1 is a perspective view showing an appearance of an electronic apparatus according to one of the embodiments. The electronic apparatus is, for example, a stylus-based portable electronic apparatus capable of handwriting input with a stylus or a finger. The electronic apparatus can be implemented as a tablet computer, a note personal computer, a smartphone, a PDA, or the like. Implementation of the electronic apparatus as a tablet computer 10 will be hereinafter described. The tablet computer 10, which is a portable electronic apparatus called a tablet or a slate computer, comprises a body 11 having a housing shaped in a thin box.

The touchscreen display 17 is mounted on the body 11 so as to overlap the upper surface of the body 11.

In the touchscreen display 17, a flat-panel display and a sensor configured to sense a contact position of a stylus or a finger on the screen of the flat-panel display are incorporated. The flat-panel display may be, for example, a liquid crystal display (LCD). As the sensor, for example, a capacitance type touchpanel, an electromagnetic induction type digitizer and the like can be used. Incorporation of two types of sensors, a digitizer and a touchpanel, in the touchscreen display 17 will be hereinafter described. For this reason, the touchscreen display 17 can sense not only a touch operation on the screen with a finger but also a touch operation on the screen with a stylus 100.

The stylus 100 may be, for example, a digitizer pen (i.e., an electromagnetic induction pen). The user can perform a handwriting input operation on the touchscreen display 17 using the stylus 100 (pen input mode). In the pen input operation, a locus of movement of the stylus 100 on the screen, i.e., a stroke handwritten by the handwriting input operation is required, and a plurality of strokes input by handwriting are thereby displayed on the screen. A locus of movement of the stylus 100 during the time when the stylus 100 is in contact with the screen corresponds to one stroke. A plurality of strokes constitute a letter or character, a symbol, and the like. A set of a number of strokes corresponding to the handwritten letters or characters, handwritten drawings, handwritten tables, and the like constitutes a handwritten document.

In the embodiment, this handwritten document is stored in a storage medium, not as image data, but as time-series information (handwritten document data) representing a coordinate sequence of a locus of each stroke and a relationship in sequence between the strokes. Details of the time-series information will be described later with reference to FIG. 4. The time-series information represents a sequence of handwriting a plurality of strokes, and includes a plurality of stroke data elements corresponding to respective strokes. In other words, the time-series information means a set of time-series stroke data elements corresponding to the respective strokes. Each stroke data element corresponds to a stroke and includes a coordinate data series (time-series coordinates) corresponding to each of points on a locus of the stroke. The sequence of the stroke data elements corresponds to the sequence in which the strokes have been handwritten.

The tablet computer 10 can read existing, arbitrary time-series information from the storage medium and display a handwritten document corresponding to the time-series information, i.e., a plurality of strokes indicated by the time-series information, on the screen. A plurality of strokes indicated by the time-series information are also a plurality of strokes input by handwriting.

Furthermore, the tablet computer 10 according to the embodiment also has a touch input mode for executing the handwriting input operation by a finger without using the stylus 100. If the touch input mode is valid, the user can execute the handwriting input operation on the touchscreen display 17 by using a finger. In the touch input mode, a locus of finger's movement on the screen, i.e., a stroke handwritten by the handwriting input operation is required, and a plurality of strokes input by handwriting are thereby displayed on the screen.

The tablet computer 10 has an edit function. Based on user's edit operations using an "eraser" tool, a range specify tool, and other various tools, the edit function allows an arbitrary handwritten part (handwritten letter or character, handwritten mark, handwritten drawing, handwritten table, and the like) in the handwritten document on the display as selected by the range specify tool to be deleted or moved. In addition, an arbitrary handwritten part in the handwritten document as selected by the range specify tool can also be designated as a search key for searching the handwritten document. An arbitrary handwritten part in the handwritten document as selected by the range specify tool can also be subjected to recognition processing such as handwritten letter/character recognition, handwritten drawing recognition and handwritten table recognition.

In the embodiment, the handwritten document can be managed as one or a plurality of pages. In this case, a set of time-series information elements fit in a screen may be recorded as a page by delimiting the time-series information (handwritten document data) in units of an area that fits in the screen. Alternatively, the page size may be set to be variable. In this case, since the page size can be extended to be larger than the size of one screen, a handwritten document having an area larger than the screen size can be handled as a page. If the overall page cannot be shown on the display, the page may be reduced or a displayed part in the page may be moved by vertical or horizontal scroll.

FIG. 2 shows an example of a cooperation between the tablet computer 10 and an external apparatus. The tablet computer 10 comprises a wireless communication device of wireless LAN and the like, and can execute wireless communication with a personal computer 1. Furthermore, the tablet computer 10 can also execute communication with a server 2 in Internet 3 by using the wireless communication device. The server 2 may be a server which executes on-line storage services or other various cloud computing services.

The personal computer 1 comprises a storage device such as a hard disk drive (HDD). The tablet computer 10 can transmit time-series information (handwritten document data) to the personal computer 1 and record the time-series information in a HDD of the personal computer 1 (Upload). To assure secure communication between the tablet computer 10 and the personal computer 1, the personal computer 1 may authenticate the tablet computer 10 when communication starts. In this case, a dialog that prompts the user to input an ID or a password may be displayed on the screen of the tablet computer 10 or the ID of the tablet computer 10 or the like may be transmitted automatically from the tablet computer 10 to the personal computer 1.

This enables the tablet computer 10 to handle a large number of elements of the time-series information or a large amount of time-series information even if the capacity of the storage in the tablet computer 10 is small.

Furthermore, the tablet computer 10 can read arbitrary one or more elements of the time-series information recorded on the HDD of the personal computer 1 (Download) and display a stroke indicated by the read time-series information on the screen of the display 17 of the tablet computer 10. In this case, a list of thumbnails obtained by reducing each page of a plurality of elements of the time-series information may be displayed on the screen of the display 17 or one page selected from the thumbnails may be displayed in a normal size on the screen of the display 17.

Moreover, a destination with which the tablet computer 10 communicates may not be personal computer 1, but the server 2 on a cloud that provides storage services. The tablet computer 10 can transmit the time-series information (handwritten document data) to the server 2 via Internet and record the time-series information in a storage device 2A of the server 2 (Upload). Moreover, the tablet computer 10 can read arbitrary time-series information recorded in the storage device 2A of the server 2 (Download) and display a locus of each stroke indicated by the time-series information on the display 17 of the tablet computer 10.

As described above, in the embodiment, the storage medium in which the time-series information is stored may be any one of the storage device in the tablet computer 10, the storage device in the personal computer 1, and the storage device of the server 2.

Next, a relationship between strokes (letters and characters, figures, tables and the like) handwritten by the user and the time-series information will be described with reference to FIG. 3 and FIG. 4. FIG. 3 shows an example of a handwritten document (or handwritten character string) handwritten on the touchscreen display 17 with a stylus 100 or the like.

On a letter or character, figure, or the like already input by handwriting, another letter or character, figure or the like is often input by handwriting, in a handwritten document. In FIG. 3, handwritten letters "A", "B", and "C" are input in this order by handwriting and then, a handwritten arrow is input at a position very close to the handwritten letter "A" by handwriting.

The handwritten letter "A" is represented by two strokes (a locus shaped in "^" and a locus shaped in "-") handwritten using the stylus 100 or the like, i.e., by two loci. The first handwritten locus of the stylus 100 shaped in "^" is, for example, sampled at a real time with equal time intervals and time series coordinates SD11, SD12, ..., SD1$n$ of the stroke shaped in "^" are thereby obtained. Similarly to this, the next handwritten locus of the stylus 100 shaped in "-" is sampled at a real time with equal time intervals and time series coordinates SD21, SD22, ..., SD2$n$ of the stroke shaped in "-" are thereby obtained.

The handwritten letter "B" is represented by two strokes handwritten using the stylus 100 or the like, i.e., by two loci. The handwritten letter "C" is represented by one stroke handwritten using the stylus 100 or the like, i.e., by one locus. The handwritten "arrow" is represented by two strokes handwritten using the stylus 100 or the like, i.e., by two loci.

Figure 4:
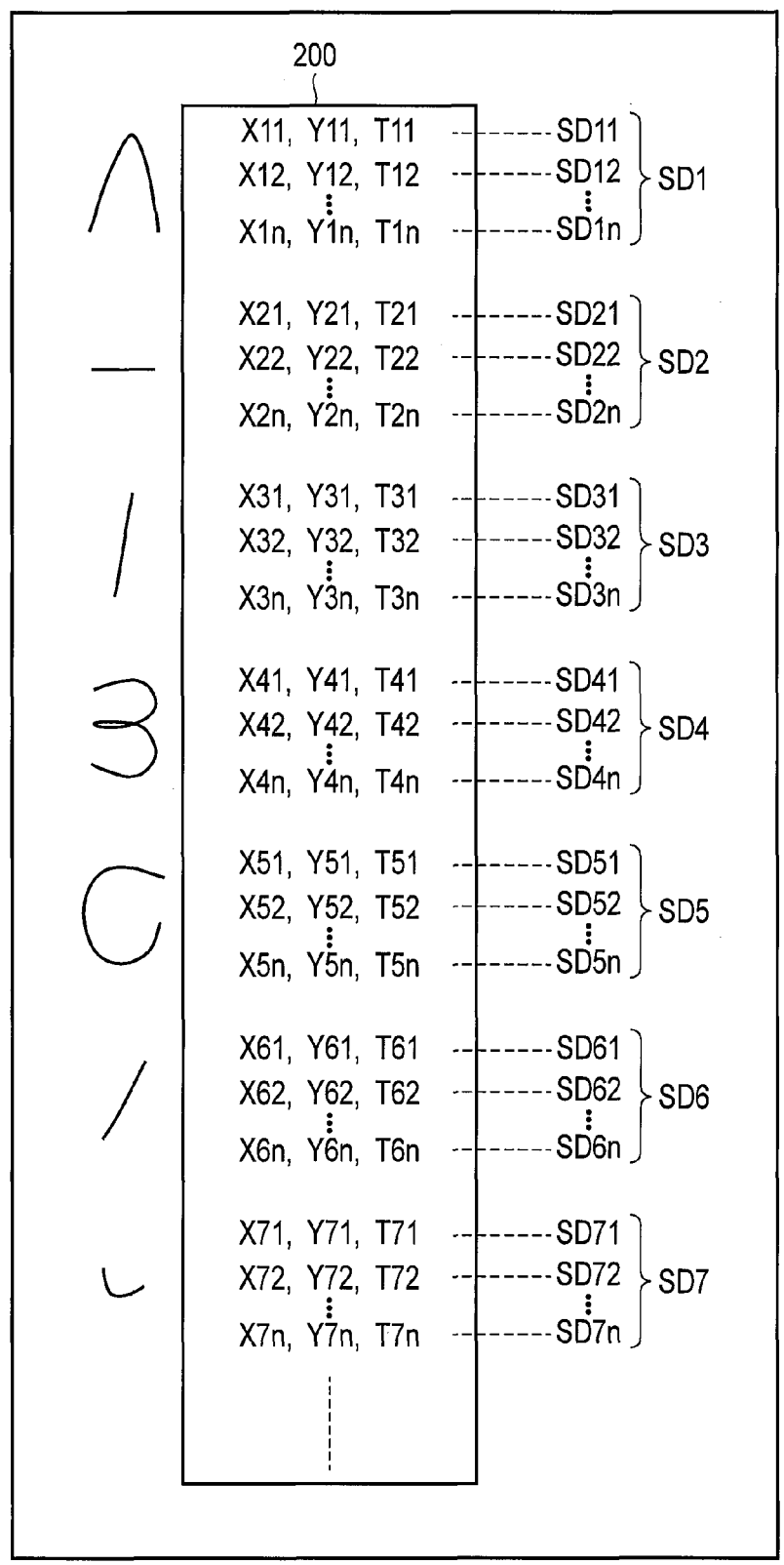
FIG. 4 is an illustration showing an example of time-series information which is a set of stroke data.

FIG. 4 shows time-series information 200 corresponding to the handwritten document shown in FIG. 3. The time-series information includes a plurality of stroke data elements SD1, SD2, ..., and SD7. In the time-series information 200, these stroke data elements SD1, SD2, ..., and SD7 are arranged in time series in an order in which the strokes have been handwritten.

In the time-series information 200, first two stroke data elements SD1 and SD2 represent the two strokes of the handwritten letter "A", respectively. Third and fourth stroke data elements SD3 and SD4 represent the two strokes constituting the handwritten letter "B", respectively. A fifth stroke data element SD5 represents the one stroke constituting the handwritten letter "C." Sixth and seventh stroke data elements SD6 and SD7 represent the two strokes constituting the handwritten "arrow", respectively.

Each stroke data element includes a coordinate data series (time-series coordinates) corresponding to one stroke, i.e., a plurality of coordinates that correspond to a plurality of sampling points on a locus of the stroke, respectively. In each of the stroke data elements, the coordinates of a plurality of sampling points are arranged in time series, in the order in which the stroke has been written (sampled). For example, as for the handwritten letter "A" stroke data element SD1 includes coordinate data series (time-series coordinates) corresponding to the respective points on a locus of the stroke shaped in "^", in the handwritten letter "A", i.e., an n number of coordinate data elements SD11, SD12, ..., SD1$n$. Stroke data element SD2 includes coordinate data series corresponding to the respective points on a locus of the stroke shaped in "-", in the handwritten letter "A", i.e., an n number of coordinate data elements SD21, SD22, ..., and SD2$n$. The number of coordinate data elements may be different in stroke data. When the strokes are sampled with equal time intervals, the strokes are different in number of sampling points since the strokes are different in length.

Each coordinate data element represents an X-coordinate and a Y-coordinate of a point in the corresponding locus. For example, coordinate data element SD11 represents X-coordinate (X11) and Y-coordinate (Y11) of the start point of the stroke shaped in "^". SD1$n$ represents X-coordinate (X1$n$) and Y-coordinate (Y1$n$) of the end point of the stroke shaped in "^".

Each of the coordinate data elements may include time stamp information T corresponding to a time point (sampling timing) at which a point corresponding to the coordinates has been handwritten. The time point at which the point has been handwritten may be either an absolute time (for example, year, month, day, hours, minutes, and seconds) or a relative time based on a certain time point. For example, an absolute time (for example, year, month, day, hours, minutes, and seconds) at which writing the stroke has started may be added to each stroke data element as time stamp information, and a relative time representing a difference from the absolute time may be further added to each coordinate data element in the stroke data element as time stamp information T.

Thus, a relationship in time between the strokes can be represented with a good accuracy by using the time-series information where the time stamp information T has been added to each of the coordinate data elements. Information (Z) indicating a writing pressure may be added to each coordinate data item though not shown in FIG. 4.

The time-series information 200 having the structure explained in FIG. 4 can represent not only handwriting of each stroke, but also temporal relationship between strokes. Therefore, the handwritten letter "A" and the tip portion of the handwritten "arrow" can be treated as different letters or figures, by using the time-series information 200, even if the tip portion of the handwritten "arrow" is written so as to overlap with the handwritten letter "A" or be close to the handwritten letter "A" as shown in FIG. 3.

Moreover, in the embodiment, since the handwritten document data is stored not as images or character recognition results, but as the time-series information 200 composed of a set of time-series stroke data elements, handwritten letters can be handled without depending on a language of handwritten letters. Therefore, the structure of the time-series information 200 in the embodiment can be used commonly in various countries different in language over the world.

Figure 5:
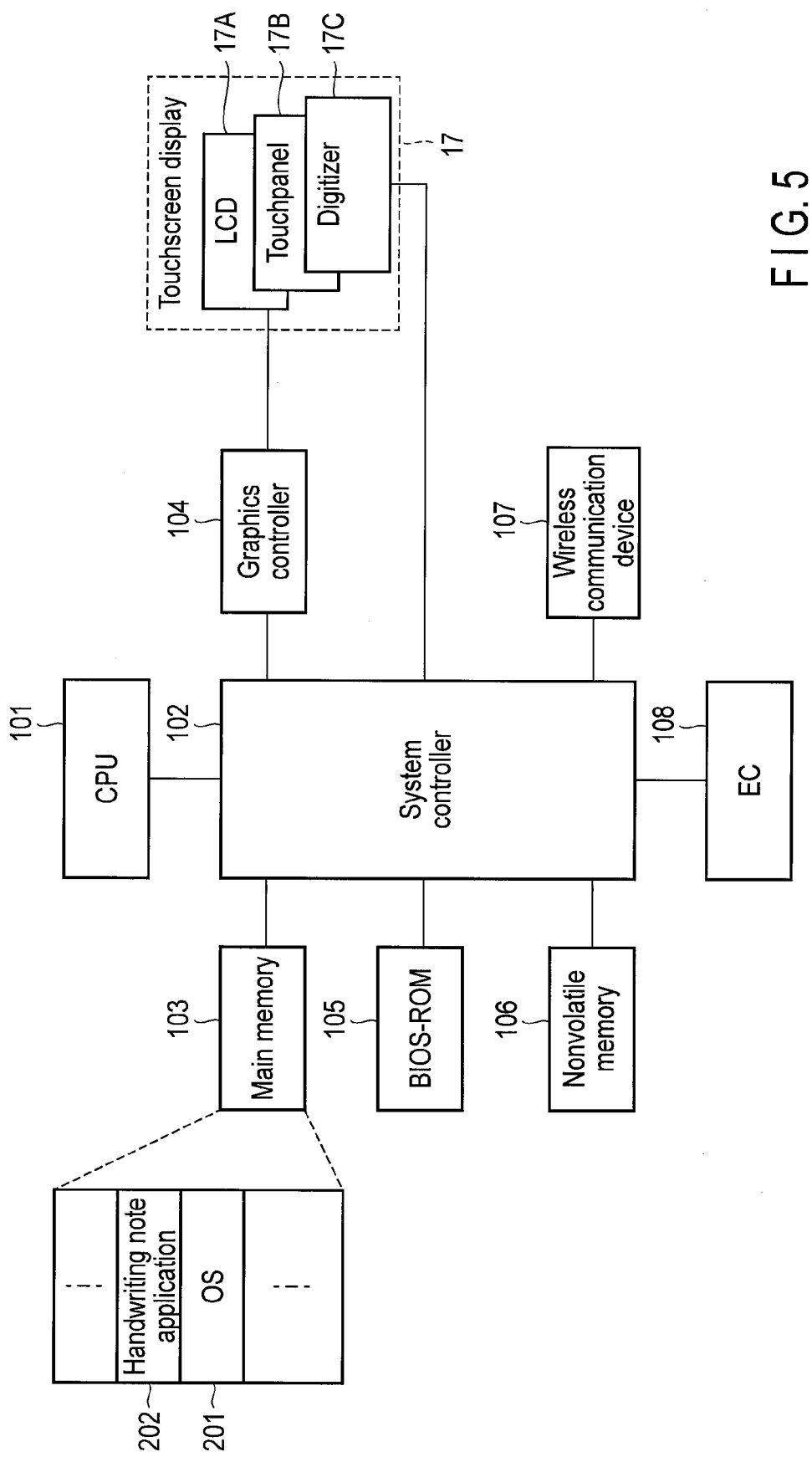
FIG. 5 is a block diagram showing an example of a system configuration of the electronic apparatus.

FIG. 5 shows a system configuration of the tablet computer 10.

The tablet computer 10 comprises a CPU 101, a system controller 102, a main memory 103, a graphics controller 104, a BIOS-ROM 105, a nonvolatile memory 106, a wireless communication device 107, an embedded controller (EC) 108, and the like.

The CPU 101 is a processor which controls the operations of various modules in the tablet computer 10. The CPU 101 executes various software programs loaded from the nonvolatile memory 106 which is a storage device to the main memory 103. These software programs include an operating system (OS) 201 and various application programs. The application programs include a handwriting note application program 202. The handwritten document data is also called a handwritten note in the following descriptions. The handwriting note application program 202 has a function of creating and displaying the above-described handwritten document, a function of editing the handwritten document data, and a handwritten document searching function of searching for handwritten document data including a desired handwritten portion or the desired handwritten portion in handwritten document data.

The CPU 101 also executes a basis input/output system (BIOS) stored in the BIOS-ROM 105. The BIOS is a program for hardware control.

The system controller 102 is a device which connects a local bus of the CPU 101 with various component modules. A memory controller which controls access to the main memory 103 is built in the system controller 102. The system controller 102 also has a function of executing communication with the graphics controller 104 via a serial bus conforming to the PCI EXPRESS standard or the like.

The graphics controller 104 is a display controller which controls an LCD 17A used as a display monitor of the tablet computer 10. A display signal generated by the graphics controller 104 is sent to the LCD 17A. The LCD 17A displays a screen image, based on the display signal. A touchpanel 17B, the LCD 17A, and a digitizer 17C are overlaid. The touchpanel 17B is a capacitance-type pointing device for inputting on the screen of the LCD 17A. A contact position on the screen where a finger touches, movement of the contact position, and the like are detected by the touchpanel 17B. The digitizer 17C is an electromagnetic pointing device for inputting on the screen of the LCD 17A. A contact position on the screen where the stylus (digitizer pen) 100 contacts, movement of the contact position, and the like are detected by the digitizer 17C.

The wireless communication device 107 is a device configured to execute wireless communication such as wireless LAN or 3G mobile communication. The EC 108 is a one-chip microcomputer which comprises an embedded controller for power management. The EC 108 has a function of turning on or off the power supply of the tablet computer 10 according to user's operations of a power button.

Next, some examples of typical screens presented to the user by the handwriting note application program 202 will be described.

Figure 6:
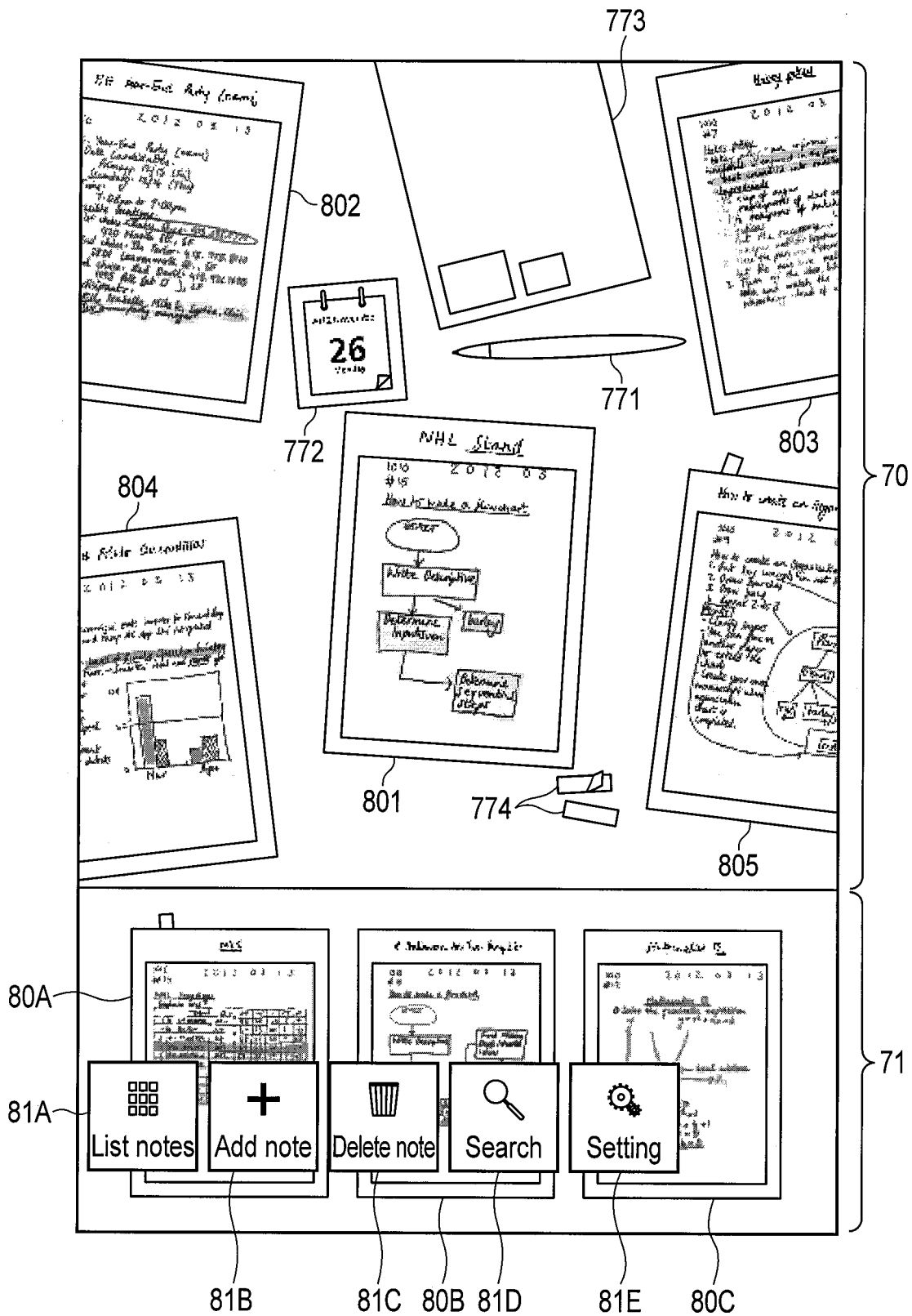
FIG. 6 is an illustration showing an example of a home screen displayed by the electronic apparatus.

FIG. 6 shows an example of a home screen of the handwriting note application program 202. The home screen is a basic screen for processing a plurality of handwritten document data elements, on which a note can be managed and the overall applications can be set.

The home screen includes a desktop screen region 70 and an extended screen region 71. The desktop screen region 70 is a temporary region in which a plurality of note icons 801 to 805 corresponding to a plurality of handwritten notes at work are displayed. Each of the note icons 801 to 805 indicates a thumbnail of a page in the corresponding handwritten note. The desktop screen region 70 further displays a pen icon 771, a calendar icon 772, a scrap note (gallery) icon 773, and a tag (label) icon 774. The pen icon 771 is a graphical user interface (GUI) for changing the display screen from the home screen to a page edit screen. The calendar icon 772 is an icon indicating a current date. The scrap note icon 773 is a GUI for viewing data (scrap data or gallery data) integrated from the other application program or external file. The tag icon 774 is a GUI for putting a label (tag) on an arbitrary page in an arbitrary handwritten note.

The extended screen region 71 is a display region for viewing a storage region in which all created handwritten notes are stored. The extended screen region 71 displays note icons 80A, 80B and 80C corresponding to some of all the handwritten notes. Each of the note icons 80A, 80B and 80C indicates a thumbnail of a page in the corresponding handwritten note. The handwriting note application program 202 can detect a gesture (for example, a swipe gesture) on the extended screen region 71 executed by the user using the stylus 100 or a finger. In response to the detection of the gesture (for example, a swipe gesture), the handwriting note application program 202 scrolls a screen image on the extended screen region 71 in a left direction or a right direction. The note icon corresponding to each of the arbitrary handwritten notes can be thereby displayed in the extended screen region 71.

Figure 7:
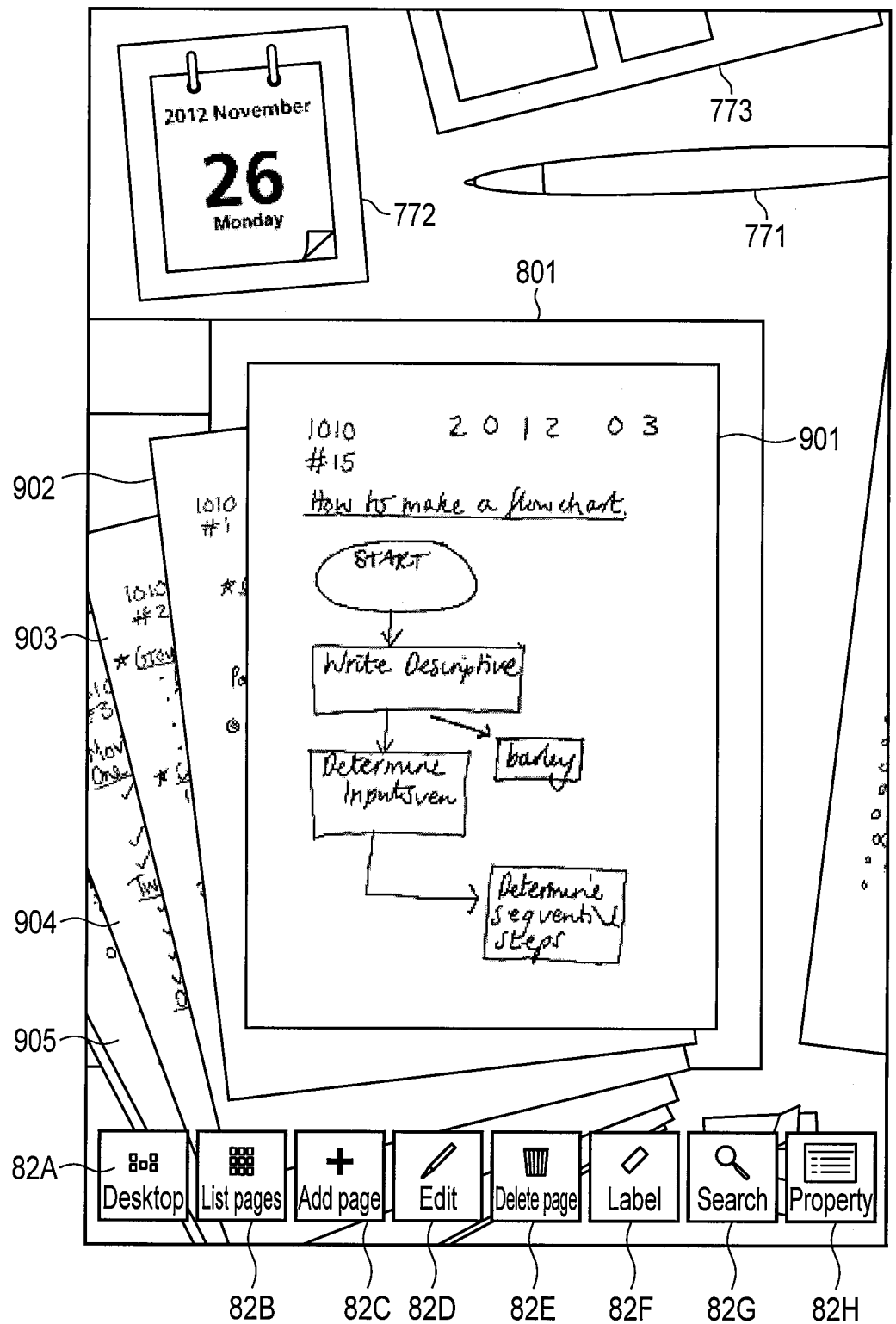
FIG. 7 is an illustration showing an example of a note preview screen displayed by the electronic apparatus.

The handwriting note application program 202 can detect the other gesture (for example, a tap gesture) on the extended screen region 71 executed by the user using the stylus 100 or a finger. In response to the detection of the gesture (for example, a tap gesture) on a note icon on the extended screen region 71, the handwriting note application program 202 moves the note icon to a central portion of the desktop screen region 70. Then, the handwriting note application program 202 selects the handwritten note corresponding to the note icon, and displays a note preview screen shown in FIG. 7 instead of the desktop screen. The note preview screen shown in FIG. 7 is a screen in which an arbitrary page in the selected handwritten note can be viewed.

Furthermore, the handwriting note application program 202 can also detect a gesture (for example, a tap gesture) on the desktop screen region 70 executed by the user using the stylus 100 or a finger. In response to the detection of the gesture (for example, a tap gesture) on a note icon located at a central portion of the desktop screen region 70, the handwriting note application program 202 selects a handwritten note corresponding to the note icon located at the central portion, and displays the note preview screen shown in FIG. 7 instead of the desktop screen.

Furthermore, the home screen can display a menu. The menu comprises a List notes button 81A, an Add note button 81B, a Delete note button 81C, a Search button 81D and a Setting button 81E displayed at a lower portion of the screen, for example, the extended screen region 71. The List notes button 81A is a button to display a handwritten note list. The Add note button 81B is a button to create (add) a new handwritten note. The Delete note button 81C is a button to delete a handwritten note. The Search button 81D is a button to open a search screen (search dialog). The Setting button 81E is a button to open a setting screen of applications.

A return button, a home button and a recent application button are also displayed under the extended screen region 71 though not shown.

FIG. 8 shows an example of a setting screen opened when the Setting button 81E is tapped by the stylus 100 or a finger.

The setting screen displays various setting items. The setting items include "backup and restore", "input mode (stylus or touch input mode)", "license information", "help", and the like.

When the Add note button 81B is tapped on the home screen by the stylus 100 or a finger, the note create screen is displayed. A name of the note is input by handwriting in a title field. A front cover and a sheet of the note can be selected. When the add button is pushed, a new note is created and placed in the extended screen region 71.

FIG. 7 shows an example of the above-described note preview screen.

The note preview screen is a screen on which an arbitrary page in the sleeted handwritten note can be viewed. Selection of the handwritten note corresponding to the note icon 801 in the desktop screen region 70 of the home screen is described here. In this case, the handwriting note application program 202 displays a plurality of pages 901, 902, 903, 904 and 905 included in the handwritten note such that at least some portions of the pages 901, 902, 903, 904 and 905 can be visually recognized and the pages 901, 902, 903, 904 and 905 are overlaid.

The note preview screen further displays the above-described pen icon 771, calendar icon 772 and scrap note icon 773.

The note preview screen can further display the menu at a lower portion of the screen. The menu comprises a Desktop button 82A, a List pages button 82B, an Add page button 82C, an Edit button 82D, a Delete page button 82E, a Label button 82F, a Search button 82G and a Property button 82H. The Desktop button 82A is a button to close a note preview and display a desktop screen. The List pages button 82B is a button to display a list of pages in a currently selected handwritten note. The Add page button 82C is a button to create (add) a new page. The Edit button 82D is a button to display a page edit screen. The Delete page button 82E is a button to delete a page. The Label button 82F is a button to display a list of types of available labels. The Search button 82G is a button to display a search screen. The Property button 82H is a button to display property of the note.

The handwriting note application program 202 can detect various gestures on the note preview screen executed by the user. For example, in response to detection of a gesture, the handwriting note application program 202 changes a page which should be displayed at the top to an arbitrary page (page feed, page return). In response to detection of a gesture (for example, a tap gesture) executed on a top page, a gesture (for example, a tap gesture) executed on the pen icon 771, or a gesture (for example, a tap gesture) executed on the Edit button 82D, the handwriting note application program 202 selects the top page and displays the page edit screen shown in FIG. 9 instead of the note preview screen.

Figure 9:
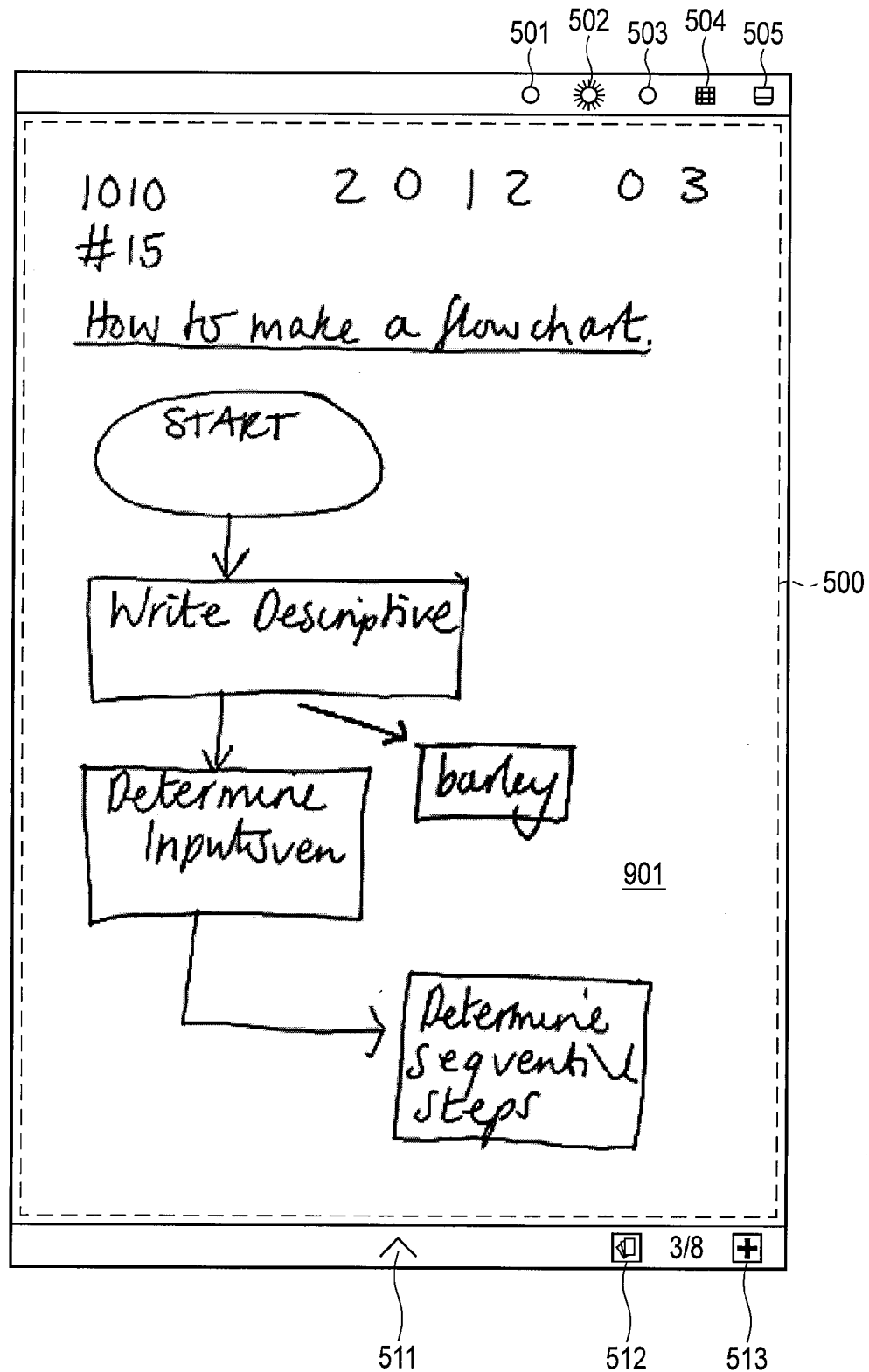
FIG. 9 is an illustration showing an example of a page edit screen displayed by the electronic apparatus.

The page edit screen in FIG. 9 is a screen on which a page in the handwritten note (i.e., a handwritten page) can be newly created and the existing page can be viewed and edited. When the page 901 on the note preview screen in FIG. 7 is selected, the page edit screen displays the content of the page 901 as shown in FIG. 9.

A rectangular region 500 surrounded by a broken line, in the page edit screen, is a handwriting input area in which handwriting can be executed. In the handwriting input area 500, an input event from the digitizer 17C is used for displaying (drawing) of the handwriting stroke, and is not used as an event indicating the gesture such as tap. On the other hand, in a region other than the handwriting input area 500, in the page edit screen, the input event from the digitizer 17C can also be used as an event indicating the gesture such as tap.

The input event from the touchpanel 17B is not used for displaying (drawing) of the handwriting stroke, but is used as an event indicating the gesture such as tap or swipe.

The page edit screen further displays a quick select menu including three pens 501 to 503 preliminarily registered by the user, a range select pen 504 and an eraser pen 505, at an upper part of the screen outside the handwriting input area 500. The black pen 501, the red pen 502 and the marker 503 are preliminarily registered by the user. The user can change the type of pen to be used by tapping the pen (button) in the quick select menu with the stylus 100 or a finger. For example, when the handwriting input operation using the stylus 100 is executed on the page edit screen in a state in which the black pen 501 is selected by the user's tap gesture using the stylus 100 or a finger, the handwriting note application program 202 displays a black stroke (locus) in accordance with the movement of the stylus 100, on the page edit screen.

The above-described three pens in the quick select menu can also be changed by operating a side button (not shown) of the stylus 100. For each of the above-described three pens in the quick select menu, combination of colors of frequently used pens with thickness of the pens can be set.

The page edit screen further displays a Menu button 511, a Return page (return to note preview screen) button 512 and an Add new page button 513 at a lower portion of the screen outside the handwriting input area 500. The Menu button 511 is a button to display the menu.

The menu may display buttons for, for example, entering the page in a trash, pasting a portion of a copy or cut page, opening the search screen, displaying an export sub-menu, displaying an import sub-menu, converting a page into a text and sending a mail, displaying a pen case, and the like. The export sub-menu allows the user to select, for example, a function to recognize a handwritten page displayed on the page edit screen and convert the handwritten page into an electronic document file, a presentation file, an image file or the like or a function to convert the page into an image file and share the image file with the other application. The import sub-menu allows the user to select, for example, a function to import a note from a note gallery or a function to import an image from the gallery. The pen case is a button to invoke a pen setting screen on which the color (i.e., color of a drawn line) and thickness (i.e., thickness of the drawn line) of each of the three pens in the quick select menu can be changed.

Figure 10:
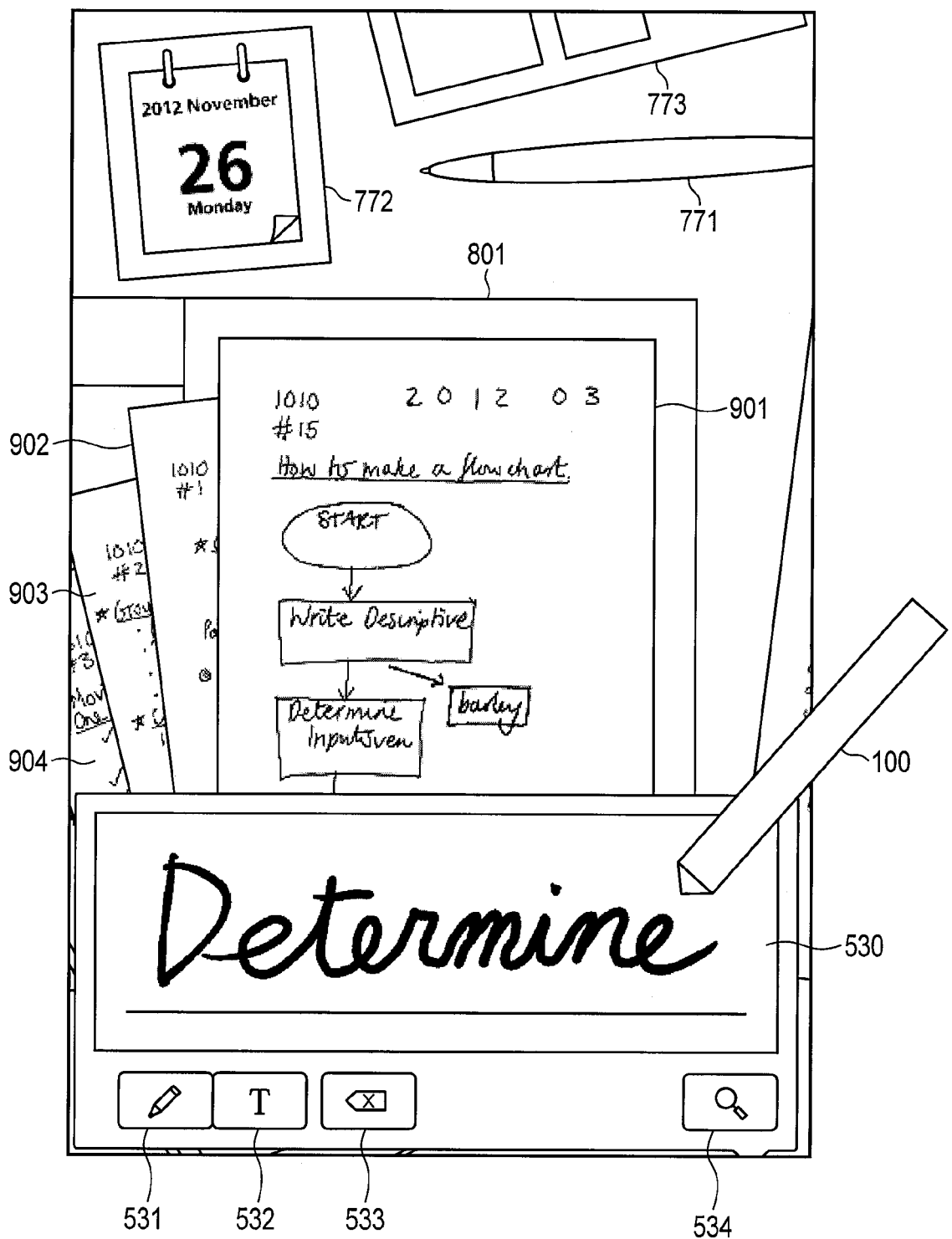
FIG. 10 is an illustration showing an example of a search dialog displayed by the electronic apparatus.

FIG. 10 shows an example of the search screen (search dialog). In FIG. 10, selecting the Search button 82G on the note preview screen shown in FIG. 7 and opening the search screen (search dialog) on the note preview screen are illustrated.

The search screen displays a search key input region 530, a handwriting search button 531, a text search button 532, a delete button 533 and a search button 534. The handwriting search button 531 is a button to select handwriting search. The text search button 532 is a button to select text search. The search button 534 is a button to require execution of search processing.

In the handwriting search, the search key input region 530 is used as an input region to handwrite a character string (hereinafter search character string), drawing, table or the like which should be used as a search key. In FIG. 10, handwritten character string "Determine" is input as the search character string in the search key input region 530. The user can handwrite not only the handwritten character string, but also a handwritten drawing, a handwritten table and the like in the search key input region 530 by means of the stylus 100. When the search button 534 is selected by the user in a state in which the handwritten character string "Determine" is input as the search character string in the search key input region 530, a stroke set (query stroke set) constituting the handwritten character string "Determine" which is the search character string is used to execute a handwriting search to search a handwritten document (note) including a stroke set corresponding to the query stroke set. In the handwriting search, a stroke set similar to the query stroke set is searched by matching between strokes. DP (Dynamic Programming) matching may be used for computation of the similarity between the query stroke set and another stroke set.

In the embodiment, when the search character string is input by handwriting in the search key input region 530, a candidate of the search character string is presented to the user every time a stroke is handwritten on the display by the user. Details of the search screen (search dialog) on the presentation of the candidate of the search key will be described later.

On the other hand, for example, a software keyboard is displayed on the screen, in the text search. The user can input an arbitrary text (character string) as the search key, in the search key input region 530, by operating the software keyboard. When the search button 534 is selected by the user in a state in which the text is input in the search key input region 530 as the search key, a text search to search for a handwritten note including a stroke set representing the text (query text) is executed.

The handwriting search/text search can be executed for all of handwritten documents or a selected handwritten document alone. When the handwriting search/text search is executed, a search result screen is displayed. In the search result screen, a list of handwritten documents (pages) including a stroke group corresponding to a query stroke group (or query text) is displayed. A hit word (i.e., the stroke group corresponding to the query stroke group or query text) is emphasized in display.

Next, a functional configuration of the handwriting note application program 202 will be described with reference to FIG. 11.

The handwriting note application program 202 is a WYSIWYG application which is capable of handling handwritten document data. The handwriting note application program 202 comprises, for example, a display processor 301, a time-series information generator 302, a search processor 303, a page storage processor 304, a page acquisition processor 305, a feature amount registration processor 306, a work memory 401, and the like. The display processor 301 comprises a handwritten data input module 301A, a handwriting drawing module 301B, and a candidate presentation processor 301C.

The above-described touch panel 17B is configured to detect occurrence of events such as "Touch", "Move (Slide)" and "Release". "Touch" is an event indicating that an object (finger) has been in contact with the screen. "Move (Slide)" is an event indicating that the contact position has been moved while the object (finger) is in contact with the screen. "Release" is an event indicating that the object (finger) has been released from the screen.

The above-described digitizer 17C is also configured to detect occurrence of events such as "Touch", "Move (Slide)" and "Release". "Touch" is an event indicating that an object (stylus 100) has been in contact with the screen. "Move (Slide)" is an event indicating that the contact position has been moved while the object (stylus 100) is in contact with the screen. "Release" is an event indicating that the object (stylus 100) has been released from the screen.

The handwriting note application program 202 displays the page edit screen for creation, viewing and editing of the handwritten page data on the touch screen display 17. In addition, the Search button 81D on the desktop screen or the Search button 82G on the note preview screen is tapped by the stylus 100 or a finger, and the handwriting note application program 202 thereby displays the search screen (search dialog) described in FIG. 10 on the touch screen display 17.

The display processor 301 and the time-series information generator 302 receive the event "Touch", "Move (Slide)" and "Release" which occurs by the digitizer 17C, and thereby detects the handwriting input operation. Coordinates of the contact position are included in the "Touch" event. Coordinates of the contact position at a movement destination are included in the "Move (Slide)" event. Therefore, the display processor 301 and the time-series information creation module 302 can receive (input) a coordinate string (i.e., stroke data) corresponding to the locus of the movement of the contact position from the digitizer 17C.

The display processor 301 displays a handwriting stroke on the screen, in accordance with the movement of the object (stylus 100) on the screen detected by using the digitizer 17C. The locus of the stylus 100 made when the stylus 100 is in contact with the screen, i.e., the locus of each stroke is displayed on the page edit screen or the search screen (i.e., search key input region 530 in the above-described handwriting search) by the display processor 301.

The time-series information creation module 302 receives the above-described coordinate string output from the digitizer 17C and creates the handwritten document data including the time-series information (coordinate data sequence) of a structure as described in detail in FIG. 4. The handwritten document data created by the time-series information creation module 302 is configured by a time-series stroke set handwritten on the display by the user. The time-series information creation module 302 temporarily stores the created handwritten document data in the work memory 401.

The search processor 303 comprises a search index in itself and executes the above-described handwriting search, text search, and the like by using the search index. More specifically, when the operation of tapping the search button 534 by the stylus 100 or a finger (search instruction operation) is executed after search character string (search key) is input in the search key input region 530 on the above-described search screen, the search processor 303 sends an instruction to the page acquisition processor 305 to acquire a handwritten document (handwritten page) including the stroke group corresponding to the search character string as the search result.

The page storage processor 304 stores in a storage medium 402 the handwritten document data including a plurality of stroke data elements corresponding to a plurality of handwriting strokes on a handwritten document (handwritten page) which is being created. The storage medium 402 may be, for example, a storage device in the tablet computer 10 or a storage device of the server computer 2.

The page acquisition processor 305 acquires arbitrary handwritten document data (handwritten page data) from the storage medium 402. More specifically, the page acquisition processor 305 acquires the handwritten document, based on the above-described instruction from the search processor 303. The acquired handwritten document data is sent to the display processor 301. The display processor 301 displays on the screen a plurality of strokes corresponding to a plurality of stroke data elements included in the handwritten document data sent from the page acquisition module 305.

When the handwritten document (data) is stored in the storage medium 402 by the page storage processor 304, the feature amount registration processor 306 converts all of the strokes constituting the handwritten document to a character string (word) by executing character recognition for the stroke set which constitutes the handwritten document. The feature amount registration processor 306, using the converted character string as a keyword, registers the keyword, a character recognition result of each stroke set obtained by adding up each stroke in the stroke set converted into the keyword (i.e., recognized as the keyword by the character recognition) in the handwritten document, in order of time series, per stroke, and the number of strokes in the stroke set, in association with one another, in a suggested feature table. Furthermore, the feature amount registration processor 306 registers the converted character string (keyword) and the stroke data corresponding to the stroke set converted into the character string, in association with each other, in the suggested feature table. It is assumed that the suggested feature table and a suggested keyword table are stored in, for example, the storage medium 402.

Next, details of the display processor 301 shown in FIG. 11 will be described.

As described above, the touchscreen display 17 detects the touch operation on the screen, on the touch panel 17B or by the digitizer 17C. The handwritten data input module 301A is a module configured to input the detection signal output from the touch panel 17B or the digitizer 17C. The detection signal includes coordinate information (X, Y) of the touch position. The handwritten data input module 301A inputs (receives), for example, the stroke data corresponding to the stroke described by handwriting on the display, by inputting the detection signal in order of time series. The stroke data (detection signal) input by the handwritten data input module 301A is supplied to the handwriting drawing module 301B.

The handwriting drawing module 301B is a module configured to draw and display a locus (handwriting) of the handwriting input on the LCD 17A of the touchscreen display 17. The handwriting drawing module 301B draws a line segment corresponding to the locus (handwriting) of the handwriting input, based on the stroke data (detection signal) from the handwritten data input module 301A.

When the stroke data input by the handwritten data input module 301A corresponds to the stroke handwritten in the search key input region 530 on the above-described search screen, the stroke data is supplied to the candidate presentation processor 301C. When the stroke data corresponding to the stroke is thus input by the handwritten data input module 301A, the candidate presentation processor 301C displays on the screen a candidate of the search character string corresponding to the stroke set (query) corresponding to stroke data which has been input at the time of inputting the corresponding stroke data (i.e., the input stroke data and stroke data which has been input). At this time, the candidate presentation processor 301C displays the candidate of the search character string to the user via the LCD 17 by referring to the suggested feature table and the suggested keyword table stored in the above-described storage medium 402.

When the candidate of the search character string thus displayed on the screen is selected, the above-described searching is executed by the search processor 303, based on (the candidate of) the search character string.

Figure 11:
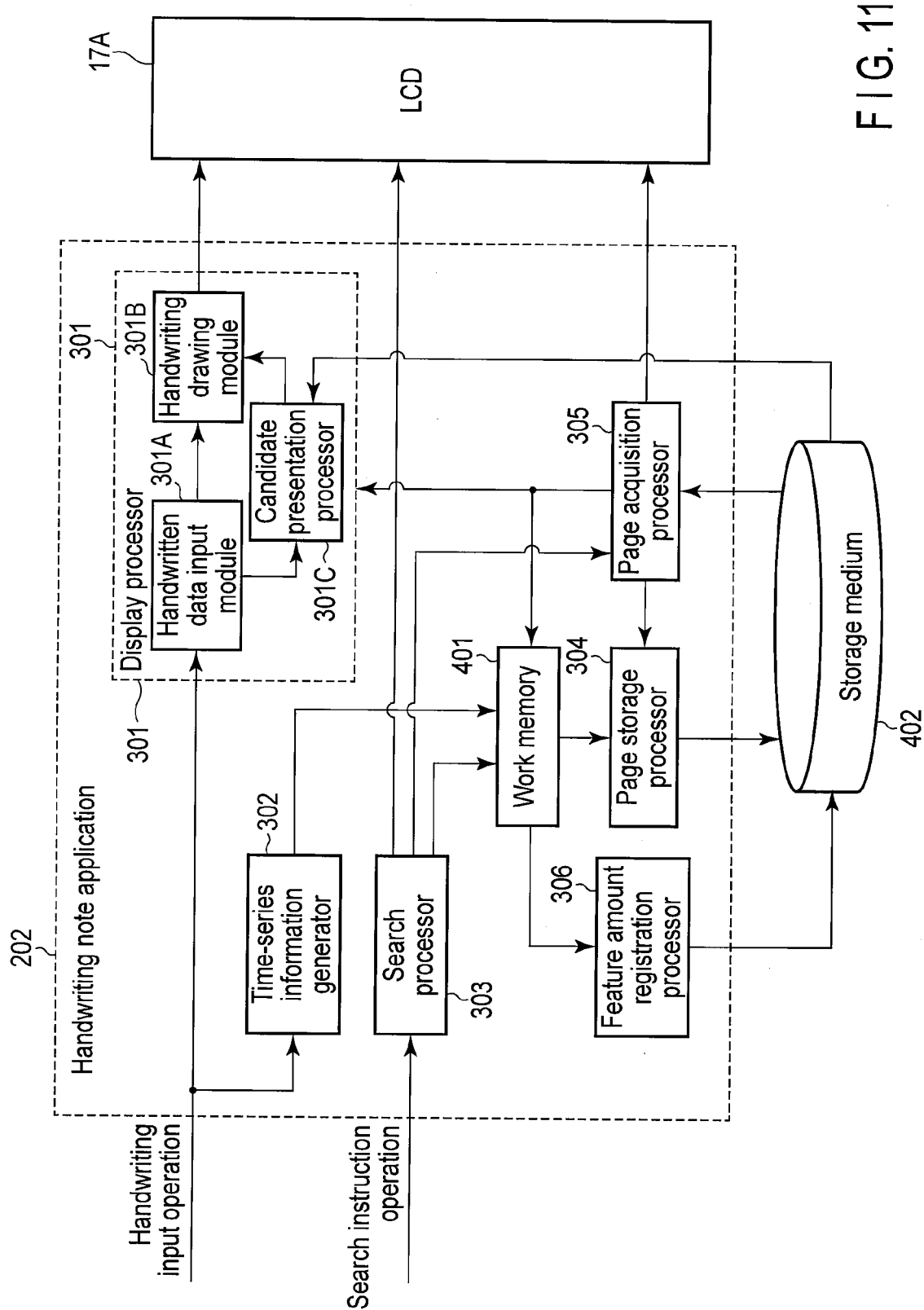
FIG. 11 is a block diagram showing an example of a functional constitution of a handwriting note application program executed by the electronic apparatus.

Besides the above-described modules, the handwriting note application program 202 comprises an edit processor configured to execute processing for editing a currently displayed handwritten document, and the like, though not shown in FIG. 11. The edit processor executes edition processing including processing of adding a new stroke (i.e., a new handwriting character, a new handwriting mark or the like) to a currently displayed handwritten document, processing of deleting or moving one or more strokes, of a plurality of displayed strokes, and the like, in accordance with an edit operation and a handwriting input operation executed on the touchscreen display 17 by the user. Furthermore, the edit processor updates time-series information in the work memory 401 to reflect a result of the edition processing on the time-series information which is being displayed.

FIG. 12 shows an example of a data structure of the suggested feature table stored in the above-described storage medium 402. A keyword, a character recognition result and a stroke count are held (registered) in association with one another, on the suggested feature table, as shown in FIG. 12. The keyword is a character string (word) corresponding to a candidate of the search character string. The character recognition result indicates a character recognition result on a part of the stroke set of the stroke set (handwriting character string) recognized as the keyword associated with the character recognition result. The stroke count indicates the number of strokes in the stroke set for which the character recognition result associated with the stroke count is obtained.

In the example shown in FIG. 12, for example, keyword "application", character recognition result "a" and stroke count "1" are held in association with one another, in the suggested feature table. According to these, it is indicated that when a stroke set recognized as the keyword "application" is handwritten by the user, the character recognition result for executing the character recognition processing at the time of handwriting one stroke is "a".

In addition, for example, keyword "application", character recognition result "ap" and stroke count "2" are held in association with one another, in the suggested feature table. According to these, it is indicated that when a stroke set recognized as the keyword "application" is handwritten by the user, the character recognition result for executing the character recognition processing at the time of handwriting two strokes is "ap".

In the example of FIG. 12, each of character strings "a" and "p" is assumed to be handwritten with one stroke.

Thus, the character recognition result for adding each one stroke to the strokes (i.e., stroke count) constituting the keyword "application" is held in the suggested feature table. In other words, the character recognition result for each stroke set obtained by adding each one stroke, in order of time series, to the strokes in the stroke set recognized as the keyword, and the number of strokes in the stroke set, are held in association with the keyword, in the suggested feature table.

When the candidate of the search character string is displayed as described above, searching is executed by using the character recognition result and the stroke count as keys, which will be described later.

FIG. 13 shows an example of a data structure of the above-described suggested keyword table stored in the storage medium 402. As shown in FIG. 13, a keyword which are used as main keys, stroke data, an appearance frequency and a selection count are held (registered) in association with one another, in the suggested keyword table. The keyword is a character string corresponding to the candidate of the search character string. The stroke data is data (i.e., binary data of the stroke) corresponding to the stroke set recognized as the keyword associated with the stroke data. The appearance frequency indicates a frequency at which (the stroke set recognized as) the keyword associated with the appearance frequency appears in, for example, the handwritten document stored in the storage medium 402. The selection count indicates a count at which the candidate of the search character string is selected by the user (as the search character string) when the candidate of the search character string is displayed on the screen based on the keyword and the stroke data associated with the selection count as described later.

In the example shown in FIG. 13, for example, keyword "app", stroke data "(10,10)-(13,8)- . . . ", appearance frequency "5" and selection count "3" are held in association with one another, in the suggested keyword table. According to these, it is indicated that the stroke data corresponding to the stroke set recognized as keyword "app" is "(10,10)-(13, 8)- . . . ". It is also indicated that (the stroke set recognized as) keyword "app" appears five times in the handwritten document stored in the storage medium 402. It is also indicated that when the candidate of the search character string is displayed on the screen based on keyword "app" and stroke data "(10, 10)-(13, 8)- . . . ", the candidate of the search character string is selected three times by the user. A plurality of coordinates corresponding to a plurality of sampling points on a locus of one stroke, respectively, are included in the stroke data, as described above.

The searching on the keyword "app" alone has been described, but searching on the other keywords is executed in a similar manner.

Operations of the tablet computer 10 according to the embodiment will be hereinafter described. Processing of the feature amount registration processor 306 (hereinafter described as feature amount registration) at storing the above-described handwritten document (data) in the storage medium 402 and processing of the candidate presentation processor 301C (hereinafter described as candidate presentation) at inputting the stroke data corresponding to the stroke handwritten in the search key input region 530 will be mainly described.

First, processing steps of the above-described feature amount registration will be described with reference to a flowchart of FIG. 14.

In the feature amount registration, when a handwritten document is stored in the storage medium 402 by the page storage processor 304, the feature amount registration processor 306 acquires the handwritten document from, for example, the work memory 401 (block B1). The handwritten document is composed of the stroke set handwritten in the handwriting input area of the page edit screen by the user, and includes the stroke data corresponding to the stroke set.

Next, the feature amount registration processor 306 executes the character recognition processing for (the stroke set corresponding to the stroke data included in) the acquired handwritten document (block B2). The stroke set constituting the handwritten document is thereby converted into a character string. At this time, (stroke data corresponding to) each of the strokes constituting the handwritten document is associated with a character to which the stroke belongs, in the character string converted by executing the character recognition processing (i.e., a character constituted by the stroke).

The feature amount registration processor 306 executes morphological analysis for the converted character string (block B3). The converted character string is thereby converted in units of words. At this time, the feature amount registration processor 306 specifies the stroke set belonging to each of the words divided by the morphological analysis, based on the strokes associated with each of the characters in the character string. In other words, each of the words divided by the morphological analysis, and a stroke alignment of the word are specified.

Next, the feature amount registration processor 306 executes integrated character recognition for the stroke set belonging to each of the words divided by the morphological analysis (block B4). The integrated character recognition is the processing for acquiring a character recognition result (character string) which is the feature amount for each stroke.

The integrated character recognition will be described with reference to FIG. 15. Execution of the integrated character recognition for the stroke set belonging to the word "apple" will be described here.

In this case, when stroke (set) 1001 in which the number of strokes (stroke count) is 1 is subjected to the character recognition, the character recognition result is "a".

Next, when stroke set 1002 in which the number of strokes (stroke count) is 2 is subjected to the character recognition, the character recognition result is "ap".

Similarly, when stroke set 1003 in which the number of strokes (stroke count) is 3 is subjected to the character recognition, the character recognition result is "app".

Furthermore, when stroke set 1004 in which the number of strokes (stroke count) is 4 is subjected to the character recognition, the character recognition result is "appl".

Finally, when stroke set 1005 in which the number of strokes (stroke count) is 5 is subjected to the character recognition, the character recognition result is "apple".

Figure 15:
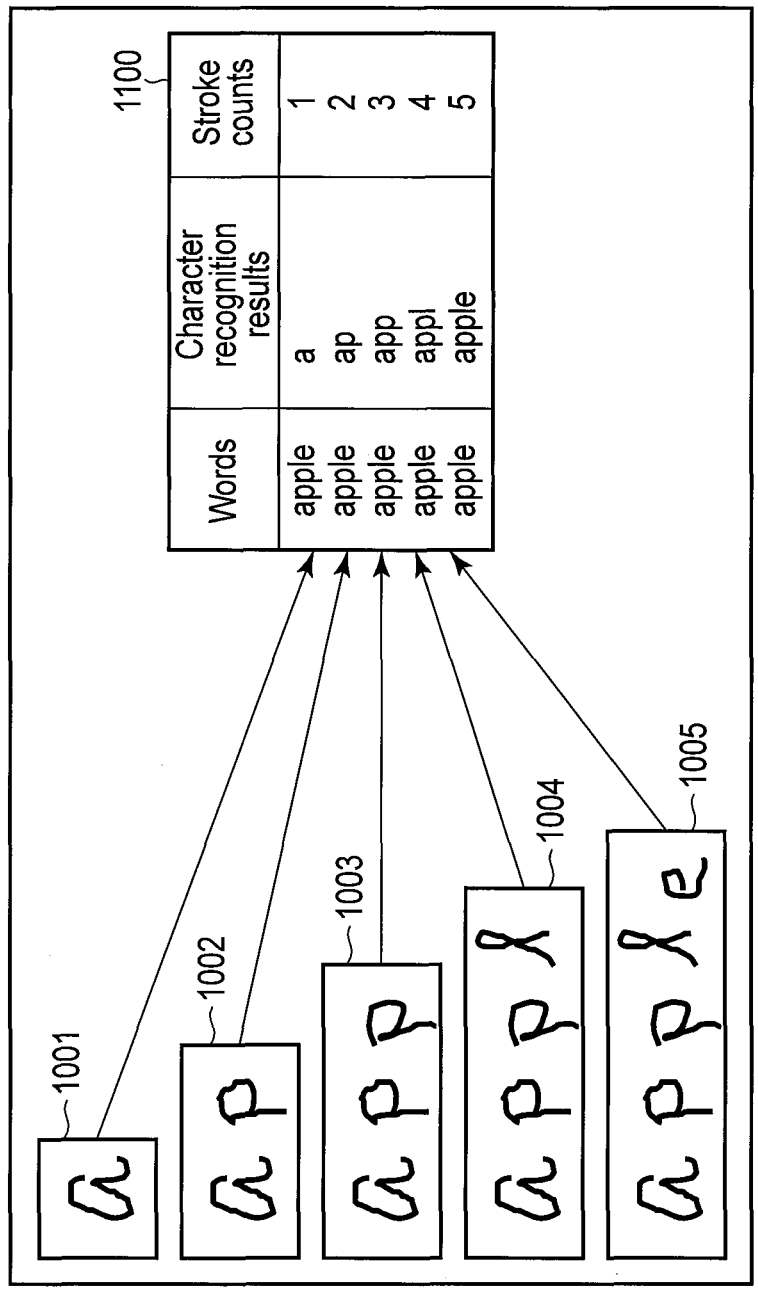
FIG. 15 is an illustration for specifically explaining an example of integrated character recognition.

When the stroke sets belonging to the word "apple" are subjected to the integrated character recognition as described above, the integrated character recognition results 1100 shown in FIG. 15 can be obtained. The integrated character recognition results 1100 include the word, the character recognition results for the stroke sets and the stroke counts (i.e., numbers of strokes in the stroke sets).

As shown in FIG. 14, the feature amount registration processor 306 registers various types of information in the suggested feature table and the suggested keyword table, based on the acquired integrated character recognition results 1100 (block B5).

More specifically, the feature amount registration processor 306 registers the word (keyword), the character recognition results and the stroke counts included in the integrated character recognition results 1100, in association with one another, in the suggested feature table. In addition, the feature amount registration processor 306 registers the word (keyword) included in the integrated character recognition results and the stroke data corresponding to the stroke sets belonging to the word, in the suggested keyword table. In the suggested keyword table, a frequency (appearance frequency) at which the keyword registered in the suggested keyword table appears in the handwritten document stored in the storage medium 402, is further registered.

In block B5, if the same information has already been held in the suggested feature table and the suggested keyword table, registration of the information is omitted.

In addition, (information of) the selection count is also held in the suggested keyword table, besides the keyword, the stroke data and the appearance frequency, but "0" is registered as the selection count in the feature amount registration. The selection count held in the suggested keyword table is updated when a candidate of the search character string displayed by the candidate presentation to be described later is selected by the user.

According to the feature amount registration, as described above, the necessary information used for the candidate presentation to be described later can be automatically registered in the suggested feature table and the suggested keyword table when the handwritten document is stored in the storage medium 402.

Next, processing steps of the candidate presentation will be described with reference to a flowchart of FIG. 16. The candidate presentation is executed every time the stroke constituting the search character string (i.e., character string which should be a search key) is handwritten in the search key input region 530 in the search screen.

First, the candidate presentation processor 301C inputs stroke data corresponding to one stroke handwritten in the search key input region 530 on the display by the user (block B11). The input stroke data is hereinafter called target stroke data.

Next, the candidate presentation processor 301C executes the character recognition (integrated character recognition) for a stroke set corresponding to the stroke data which has been input when the target stroke data is input (i.e., the stroke set handwritten in the search key input region 530) (block B12). More specifically, if the target stroke data is assumed to be stroke data corresponding to an n-th stroke of the search key, the candidate presentation processor 301C executes the character recognition for stroke set of the first to n-th strokes. The candidate presentation processor 301C thereby acquires the character recognition result.

Based on the acquired character recognition result and the stroke count in the stroke set for which the character recognition result is acquired, the candidate presentation processor 301C searches for the keyword (i.e., the candidate of the search character string) corresponding to the stroke set (i.e., stroke set of the first to n-th strokes) (block B13). More specifically, the candidate presentation processor 301C searches for the keyword held in the suggested feature table in association with the acquired character recognition result and the number of strokes (i.e., the stroke count) in the stroke set for which the character recognition result are acquired. In block B13, a plurality of keywords may be searched.

Next, the candidate presentation processor 301C ranks each searched keyword (block B14).

Ranking keywords will be described here. In the character recognition, the keywords are often associated with a language dictionary. When the character recognition is executed during, for example, handwriting input of the search character string (the character recognition is executed for, for example, the stroke set of "ap"), the handwriting input is often converted into a meaningful word which has a close shape. For this reason, if the keyword does not have a meaning during the handwriting input, the search character string which the user intends cannot be often presented (displayed). In addition, in general, the candidate is correct at higher possibility as the number of characters is increased.

In the embodiment, ranking is executed such that when stroke data corresponding to the n-th stroke (i.e., second stroke data corresponding to the second stroke) is input (received) continuously after the stroke data corresponding to the n−1-th stroke (i.e., first stroke data corresponding to the first stroke), and when a candidate of the search character string (i.e., first candidate of the character string) corresponding to set of stroke data which have been input at inputting the stroke data corresponding to the n−1-th stroke (i.e., stroke set of the first to n−1-th strokes) is different from a candidate of the search character string (i.e., second candidate of the character string) corresponding to set of stroke data which have been input at inputting the stroke data corresponding to the n-th stroke (i.e., query of the first to n-th strokes), the candidate of the search character string corresponding to the stroke set of the first to n-th strokes is displayed on the screen with higher priority to the candidate of the search character string corresponding to the stroke set of the first to n−1-th strokes.

Ranking the keywords will be described in detail with reference to FIG. 17. It is assumed here that the user inputs "apple" by handwriting as the search character string. As shown in FIG. 17, the character recognition result for the first stroke is "a", the character recognition result for the stroke set of the first and second strokes is "as", the character recognition result for the stroke set of the first to third strokes is "app", the character recognition result for the stroke set of the first to fourth strokes is "appl", and the character recognition result for the stroke set of the first to fifth strokes is "apple".

The character recognition result for the stroke set of the first and second strokes, which is not "ap" but "as", results from a fact that, for example, where the user should input "p" by handwriting, the user inputs a character which would be recognized as not "p" but "s" by handwriting at the second stroke.

The character recognition result for the stroke set of the first to third strokes, which is not "asp" but "app", results from a fact that, based on the character recognition result for the third stroke, which is "p", the character recognition result for the stroke set of the first to third strokes is "asp", but is recognized (corrected) to be "app" since, for example, a keyword starting with "asp" is considered to be absent in the suggested feature table shown in FIG. 12 or the suggested keyword table shown in FIG. 13.

First, when the first stroke (data) is input, for example, "apple", "approve" and "application" are searched as the keywords in the processing in block B13 since the character recognition result is "a". In this case, the stroke count ("1" in this case) is assigned as a point for ranking, to each of the searched keywords "apple", "approve" and "application". In FIG. 17, a numerical value in [ ] indicates a point assigned to each of the keywords.

Next, when the second stroke (data) is input, for example, "asterisk" is searched as the keyword in the suggested feature table, in the processing in block B13 since the character recognition result is "as". In this case, the stroke count ("2" in this case) is assigned as the point for ranking, to the searched keyword "asterisk". The point for the keywords "apple", "approve" and "application" which are not searched at inputting the second stroke is 1, similarly to the point for the first stroke (i.e., maintained).

Next, when the third stroke (data) is input, for example, "apple", "approve" and "application" are searched as the keywords in the suggested feature table, in block B13 since the character recognition result is "app". In this case, the stroke count ("3" in this case) is assigned as the point for ranking, to the searched keywords "apple", "approve" and "application". When the point is thus assigned to the keywords "apple", "approve" and "application", the point of each of the keywords "apple", "approve" and "application" is totally 4, including the point at the first stroke. The point for the keyword "asterisk", which is not searched at inputting the third stroke, is 2, similarly to the point for the second stroke (i.e., maintained).

Next, when the fourth stroke (data) is input, for example, "apple" and "application" are searched as the keywords in the suggested feature table, in block B13 since the character recognition result is "appl". In this case, the stroke count ("4" in this case) is assigned as the point for ranking, to the searched keywords "apple" and "application". When the point is thus assigned to the keywords "apple" and "application", the point of each of the keywords "apple" and "application" is totally 8, including the point at the third stroke. The points for the keywords "approve" and "asterisk", which are not searched at inputting the fourth stroke, are 4 and 2, respectively, similarly to the points for the third stroke (i.e., maintained).

Lastly, when the fifth stroke (data) is input, for example, "apple" is searched as the keyword in the suggested feature table, in block B13 since the character recognition result is "apple". In this case, the stroke count ("5" in this case) is assigned as the point for ranking, to the searched keyword "apple". When the point is thus assigned to the keyword "apple", the point of the keyword "apple" is totally 13, including the point at the fourth stroke. The points for the keywords "application", "approve" and "asterisk", which are not searched at inputting the fifth stroke, are 8, 4 and 2, respectively, similarly to the points for the fourth stroke.

Thus, in the embodiment, for example, every time the stroke is handwritten to assign n points to the keywords searched at the n-th stroke (i.e., keywords matching at the n-th stroke), the point is integrated, and the keywords (i.e., candidates of the search character string) having higher total values of the points are thereby ranked to be displayed at higher positions (i.e., displayed in order of ranks 1-4).

Figure 16:
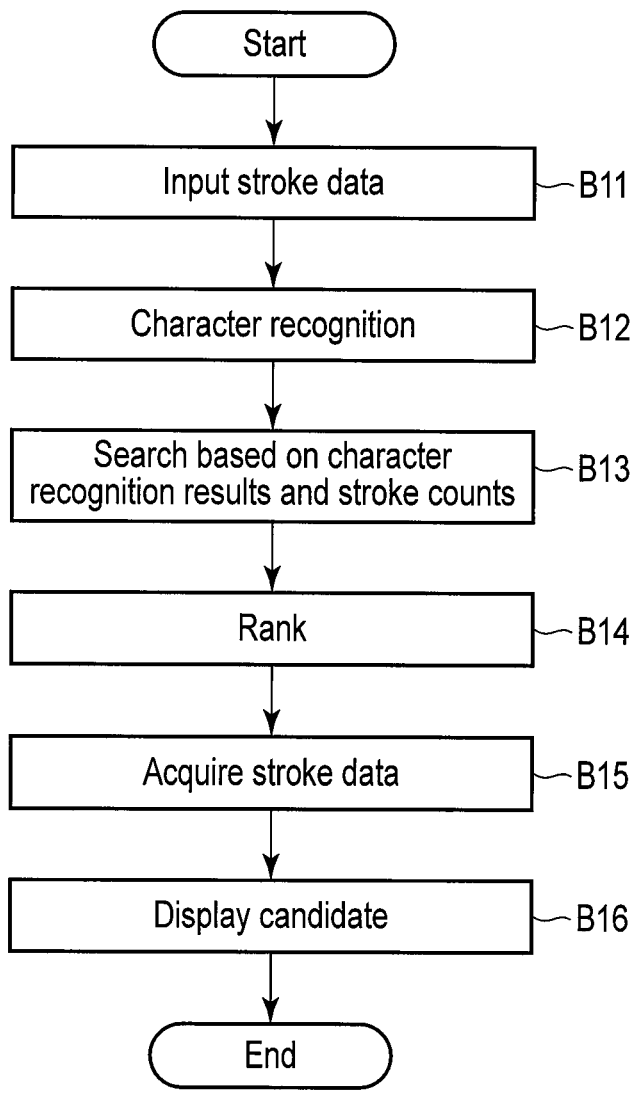
FIG. 16 is a flowchart showing an example of candidate presentation.

As shown in FIG. 16, the candidate presentation processor 301C acquires the stroke data corresponding to the stroke sets constituting the searched keywords (block B15). More specifically, the candidate presentation processor 301C acquires the stroke data held in the suggested keyword table in association with the searched keywords.

The candidate presentation processor 301C displays the candidates of the search character string by drawing the searched keywords and the acquired stroke data on the display (screen) (block B16). In this case, the searched keywords are displayed as texts while the acquired stroke data is displayed as the handwriting character string.

The candidates of the search character string are displayed on the screen, with higher priority, in order of higher points assigned to the candidates (keywords) of the search character string in the ranking.

In other words, in the example shown in FIG. 17, when the first stroke (data) is input, (texts and handwritten character strings of) "apple", "approve" and "application" are displayed on the screen as the candidates of the search character string. If the points assigned to the candidates (keywords) of the search character string are the same, the candidates of the search character string may be displayed in arbitrary order. When the second or more strokes are input, the same processing is executed.

When the second strokes (data) are input, (texts and handwritten character strings of) "asterisk", "apple", "approve" and "application" are displayed on the screen as the candidates of the search character string. The point assigned to "asterisk" is higher than the point assigned to each of "apple", "approve" and "application". In this case, "asterisk" is displayed with higher priority than "apple", "approve" and "application".

When the third strokes (data) are input, (texts and handwritten character strings of) "apple", "approve", "application" and "asterisk" are displayed on the screen as the candidates of the search character string. The point assigned to each of "apple", "approve" and "application" is higher than the point assigned to "asterisk". In this case, "apple", "approve" and "application" are displayed with higher priority than "asterisk".

When the fourth strokes (data) are input, (texts and handwritten character strings of) "apple", "application", "approve" and "asterisk" are displayed on the screen as the candidates of the search character string. The point assigned to each of "apple" and "application" is higher than the point assigned to each of "approve" and "asterisk". In this case, "apple" and "application" are displayed with higher priority than "approve" and "asterisk". Furthermore, the point assigned to "approve" is higher than the point assigned to "asterisk". In this case, "approve" is displayed with higher priority than "asterisk".

When the fifth strokes (data) are input, (texts and handwritten character strings of) "apple", "application", "approve" and "asterisk" are displayed on the screen as the candidates of the search character string. The point assigned to "apple" is higher than the point assigned to each of "application", "approve" and "asterisk". In this case, "apple" is displayed with higher priority than "application", "approve" and "asterisk". Furthermore, the point assigned to "application" is higher than the point assigned to "approve" and "asterisk". In this case, "application" is displayed with higher priority than "approve" and "asterisk". Similarly to this, the point assigned to "approve" is higher than the point assigned to "asterisk". In this case, "approve" is displayed with higher priority than "asterisk".

Thus, in the embodiment, every time the stroke is handwritten on the display, the candidates of the search character string can be changed.

The candidates of the search character string have been described as displayed by both the text and the hand written character string. However, the candidates of the search character string may be displayed by at least one of the text and the hand written character string.

In addition, the candidates of the search character string have been described as displayed on the screen in arbitrary order when the points assigned to the candidates of the search character string are the same. However, the candidates may be further ranked, based on, for example, the appearance frequency held in the suggested keyword table shown in FIG. 13. In this case, the candidates of the search character string having higher appearance frequency, of the candidates (keywords) of the search character string assigned the same points, are displayed on the screen with higher priority.

The candidates may be further ranked, based on the selection count held in the suggested keyword table shown in FIG. 13. In this case, the candidates of the search character string having higher selection count, of the candidates of the search character string assigned the same points, are displayed on the screen with higher priority.

The (information of) appearance frequency or selection count does not need to be definitely used but, if the appearance frequency or the selection count is not used, the appearance frequency or the selection count may not be held in the suggested keyword table. On the other hand, if the appearance frequency and the selection count are held in the suggested keyword table, the user may be able to select ranking the candidates by using both the appearance frequency and the selection count, ranking the candidates by using either the appearance frequency or the selection count, or using neither the appearance frequency nor the selection count. Furthermore, if the candidates are ranked by both the appearance frequency and the selection count, using either the appearance frequency or the selection count with high priority can be set.

If the fifth stroke (data) is input, in the example shown in FIG. 17, "apple", "application", "approve" and "asterisk" are displayed on the screen as the candidates of the search character string. However, some of the candidates of the search character string alone may be displayed on the screen, based on the points (priorities) assigned to the candidates of the search character string. More specifically, for example, a candidate of the search character string assigned the point equal to or greater than a third of the maximum value of the point assigned to each of the candidates of the search character string can be displayed on the screen. In this structure, if the fifth stroke (data) shown in FIG. 17 is input, "apple" and "application" alone can be displayed on the screen as the candidates of the search character string.

Next, the search dialog at displaying the candidates of the search character string will be described in detail with reference to FIG. 18 and FIG. 19. Portions which are the same as the above-described portions in FIG. 10 are denoted by the same reference numbers and their detailed descriptions are omitted.

Figure 18:
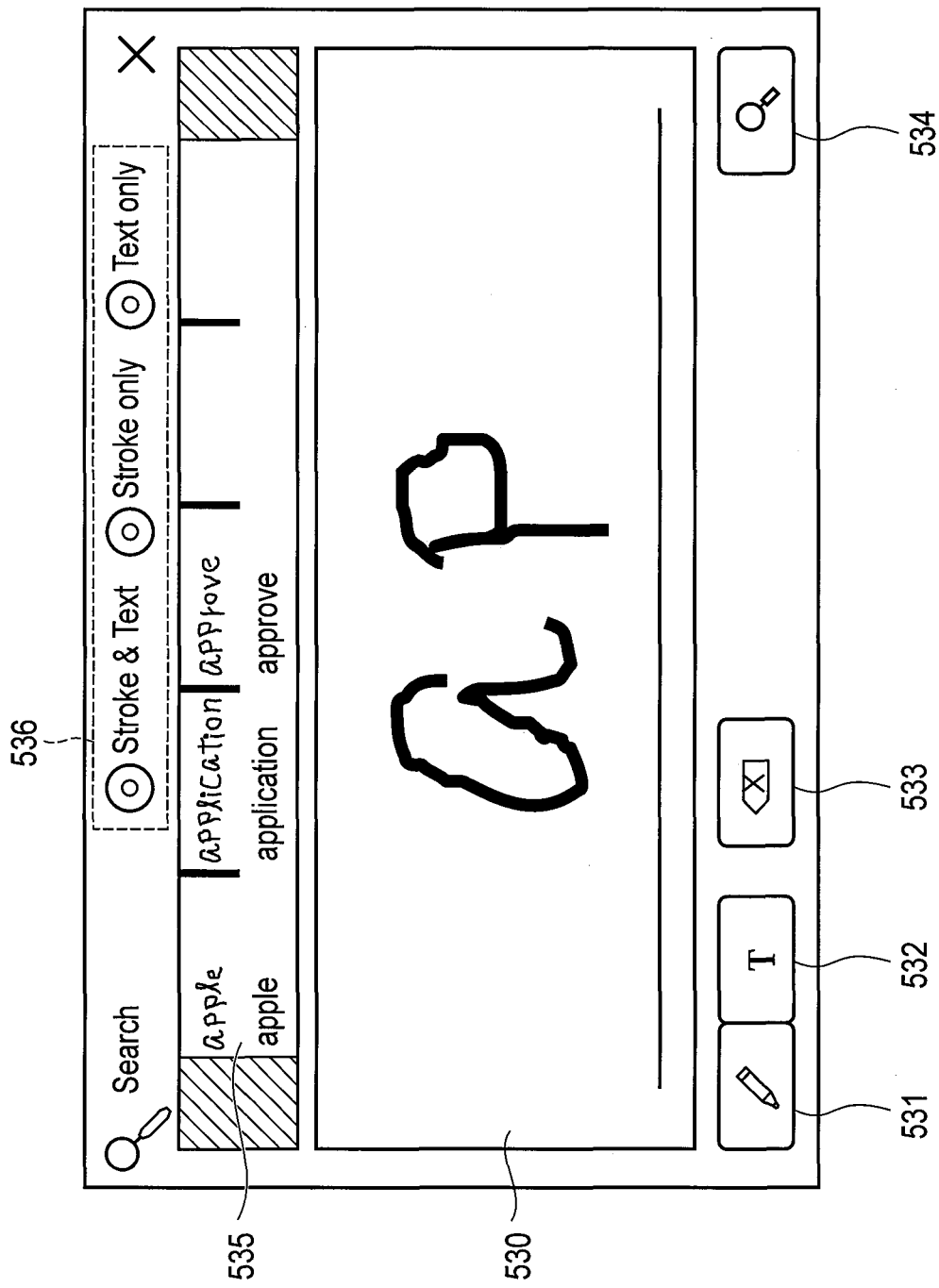
FIG. 18 is an illustration for explaining an example of a search dialog at displaying search character string candidates in detail.

FIG. 18 shows an example of the search dialog at handwriting the stroke set (first and second strokes) recognized as "ap" by the character recognition, in the search key input region 530. FIG. 19 shows an example of the search dialog at handwriting the stroke set (first to fourth strokes) recognized as "appl" by the character recognition, in the search key input region 530.

Figure 19:
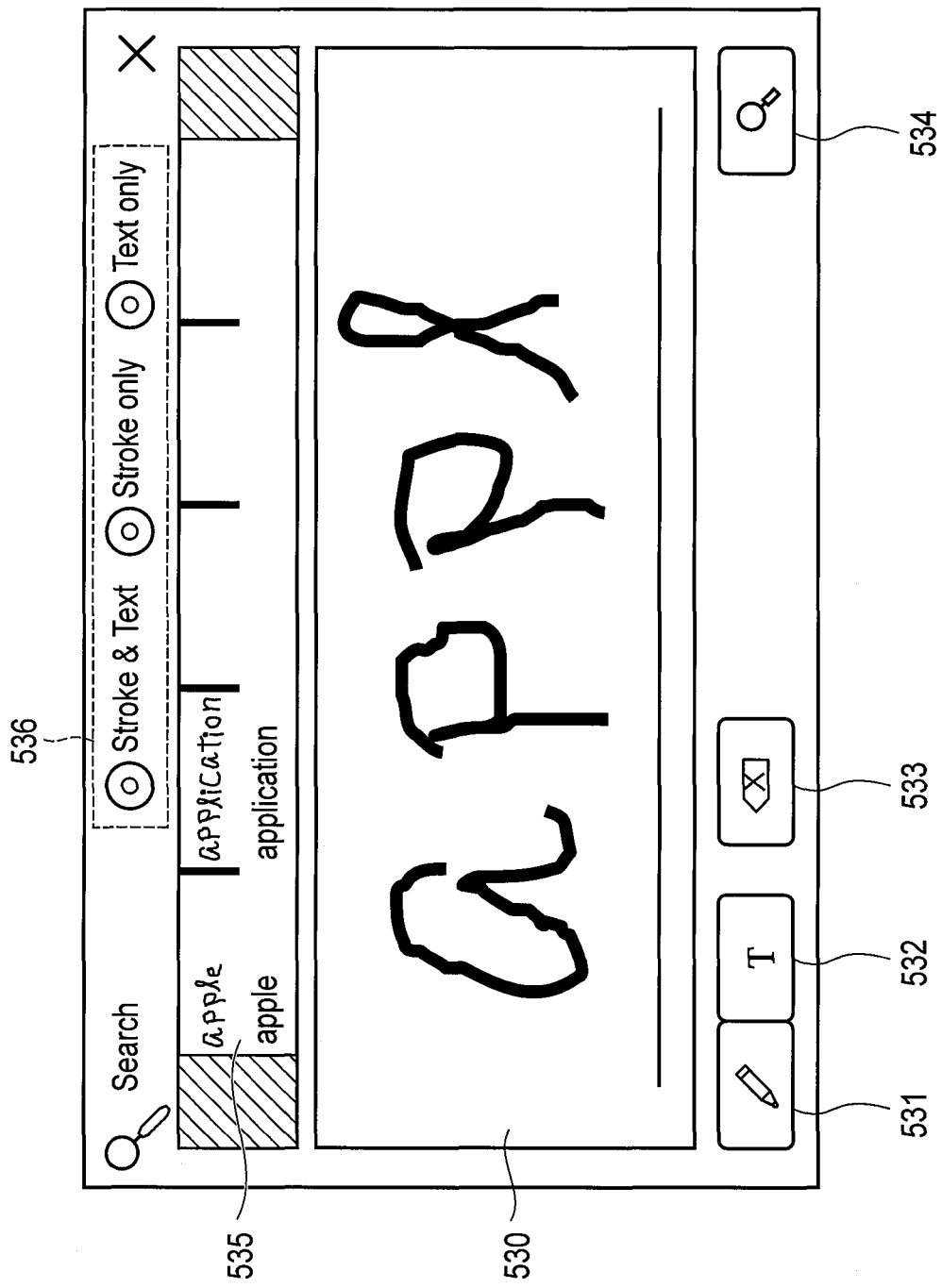
FIG. 19 is an illustration for explaining an example of a search dialog at displaying search character string candidates in detail.

As shown in FIG. 18 and FIG. 19, a candidate presentation region 535 and a presentation aspect selection region 536 are provided in the search dialog.

The candidate presentation region 535 is a region where the candidates of the search character string corresponding to the stroke set handwritten in the search key input region 530 are displayed. More specifically, the handwritten character strings based on the stroke data acquired in block B15 shown in FIG. 16 are displayed at an upper stage of the candidate presentation region 535, as shown in FIG. 18 and FIG. 19. On the other hand, texts based on the keywords searched in block B13 shown in FIG. 16 are displayed at a lower stage of the candidate presentation region 535. In addition, the candidates of the search character string displayed with higher priority (i.e., the candidates of the search character string having higher points assigned for ranking) are displayed in order from the left side, in FIG. 18 and FIG. 19.

In the example in FIG. 18, "apple", "application" and "approve" are displayed in order from the left side, as the candidates of the search character string, in the candidate presentation region 535. According to this, for example, "apple" can be recognized as the candidate of the search character string displayed with higher priority, based on the point assigned for ranking, appearance frequency, etc.

In the example in FIG. 19, "apple" and "application" are displayed in order from the left side, as the candidates of the search character string, in the candidate presentation region 535. According to this, for example, "apple" can be recognized as the candidate of the search character string displayed with higher priority, based on the point assigned for ranking, appearance frequency, etc. In addition, for example, a candidate which does not include "pl", of the candidates of the search character string displayed in the candidate presentation region 535 shown in FIG. 18, is not displayed by displaying a part of the candidates of the search character string alone on the screen, in the example in FIG. 19.

In the examples shown in FIG. 18 and FIG. 19, the candidates of the search character string displayed with higher priority (i.e., candidates of the search character string having higher priority) are displayed in order from the left side. However, the candidates of the search character string displayed with higher priority may be displayed in the other aspect. More specifically, the candidates of the search character string displayed with higher priority may be displayed in an aspect which can be distinguished from an aspect of the other candidates of the search character string such as changing a color of the candidates.

The presentation aspect selection region 536 is a region where the user selects the presentation aspect ("Stroke & Text", "Stroke only" and "Text only") of the candidates of the search character string. In other words, the user can select displaying the candidates of the search character string by both the handwritten character strings and texts, displaying the candidates by the handwritten character strings only, and displaying the candidates by texts only, in the presentation aspect selection region 536.

If, for example, "Stroke & Text" is selected in the presentation aspect selection region 536 by the user, both the handwritten character strings and the texts are displayed as the candidates of the search character string in the candidate presentation region 535 as shown in FIG. 18 and FIG. 19. If, for example, "Stroke only" is selected in the presentation aspect selection region 536 by the user, the handwritten character strings alone are displayed as the candidates of the search character string in the candidate presentation region 535. If, for example, "Text only" is selected in the presentation aspect selection region 536 by the user, the texts alone are displayed as the candidates of the search character string in the candidate presentation region 535.

In addition, the user can select (designate) a desired search character string, of the candidates of the search character string displayed in the search screen shown in FIG. 18 and FIG. 19. In this case, the searching is executed based on (the candidate of) the search character string selected by the user.

More specifically, if the handwritten character string displayed as the candidate of the search character string is selected, the handwriting search is executed based on the handwritten character string. According to the handwriting search, by using the stroke set (query stroke set) constituting the selected handwritten character string, handwritten documents including the stroke set corresponding to the query stroke set are searched.

On the other hand, if the text displayed as the candidate of the search character string is selected, the text search is executed based on the text. According to the text search, handwritten documents including the stroke set indicating the selected text are searched.

If the candidate of the search character string is selected by the user, the searching is executed. However, if the candidate of the search character string is selected, the searching may be executed when the search button 534 is selected by the user, after the selected candidate (for example, handwritten character string) of the search character string is once displayed in the search key input region 530.

Figure 20:
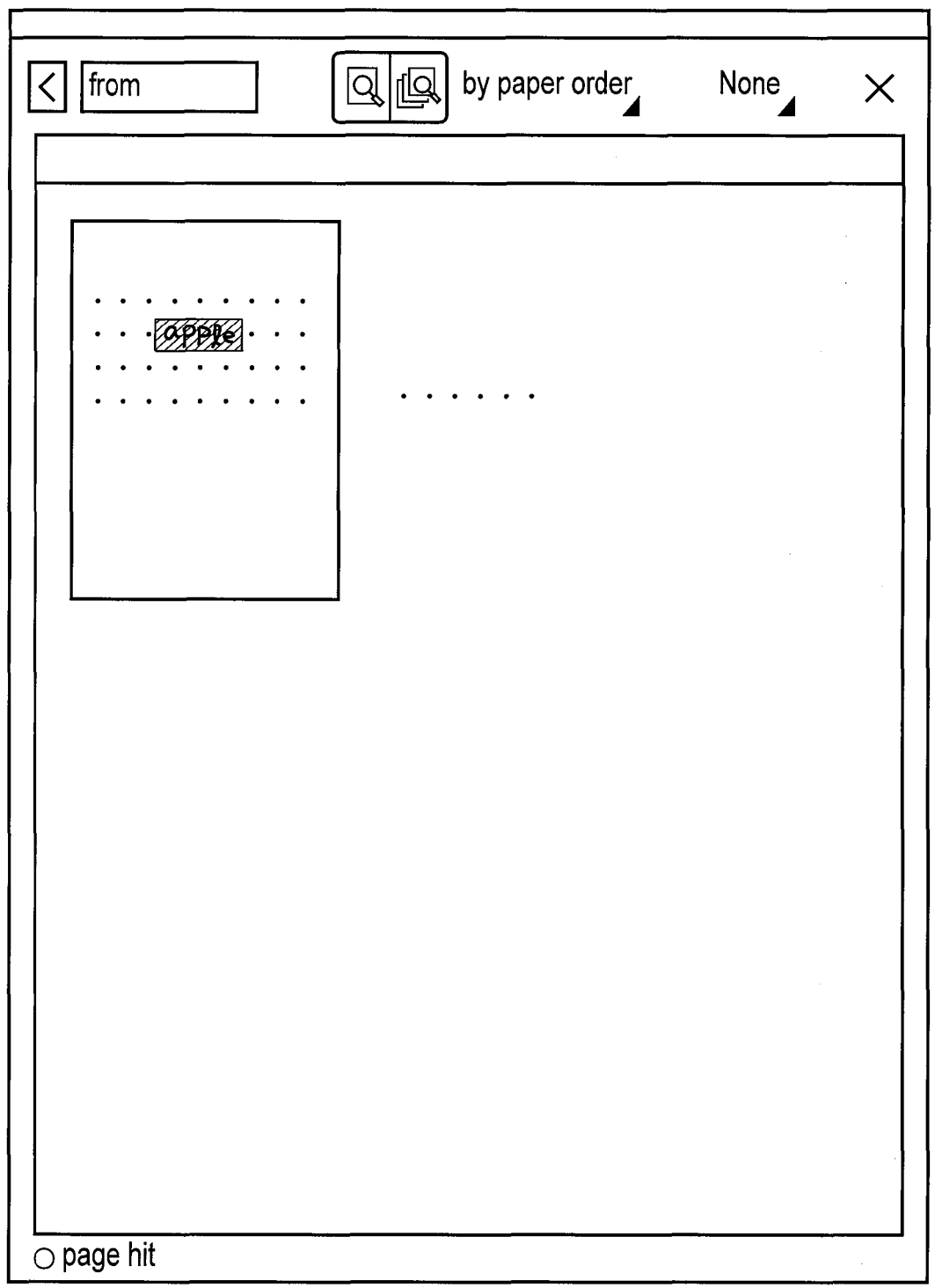
FIG. 20 is an illustration showing an example of a search result of selecting handwritten character string "apple" as a search character string candidate.

FIG. 20 shows an example of the search result from selecting, for example, the handwritten character string "apple" as the candidate of the search character string. The search result from selecting the handwritten character string "apple" as the candidate of the search character string includes a handwritten document including the stroke set corresponding to the query stroke set constituting the handwritten character string "apple". In the handwritten document included in the search result, the stroke set corresponding to the query stroke set constituting the handwritten character string "apple" is emphasized as shown in FIG. 20.

The candidate presentation is executed every time the stroke is handwritten in the search key input region 530, and the displayed candidates of the search character string can be thereby updated.

When the candidate of the search character string displayed on the search screen shown in FIG. 18 and FIG. 19 is selected as the desired search character string by the user, "1" is added to the selection count held in the suggested keyword table in association with the keyword or the stroke data used when the selected candidate of the search character string is displayed. The selection count of the candidate of the search character string can be thereby updated every time the candidate of the search character string is selected by the user.

In the embodiment, as described above, the stroke data corresponding to the handwritten strokes is input. When the stroke data corresponding to the strokes is input, the candidates of the search character string corresponding to the stroke set corresponding to the stroke data which has been input when the stroke data is input are displayed on the screen. Thus, since the search character string can be input at a small number of steps without handwriting all of search character strings (search keys), labor for the searching work can be saved. Since the candidates of the search character string are searched and displayed by using the character recognition result for the stroke set handwritten on the display and the number of strokes (stroke count) in the stroke set as keys, as described above, unnecessary candidates of the search character string (noise) can be reduced and appropriate candidates of the search character string alone can be displayed.

In addition, since the searching can be executed by selecting the candidates displayed on the screen alone, without handwriting all of search character strings, the searching can be executed using appropriate search character string even if spelling, writing manner, etc. of a word to be search character string is unclear.

Furthermore, since the character recognition result for the handwritten stroke set, which is a one-dimensional quantity, is used in the embodiment, a lightweight search algorithm can be used and the processing at displaying the candidates of the search character string can be accelerated as compared with use of a multi-dimensional quantity.

In the embodiment, the user can select displaying the candidates of the search character string by both of the handwritten character string and the text, displaying the candidates by the handwritten character string, and displaying the candidates by the text. The searching on which a user's intention is more reflected can be executed since the searching is executed based on the handwritten character string or text selected by the user.

Moreover, in the embodiment, unnecessary displaying of the candidates of the search character string can be suppressed by displaying some of the candidates of the search character string on the screen in accordance with the priority (i.e., the point assigned for ranking) of each of the candidates of the search character string, and user's convenience can be thereby enhanced.

In the embodiment, by assigning (integrating) the point for each stroke, the candidates of the search character string with high accuracy (i.e., intended by the user) can be displayed every time the number of strokes (stroke count) is increased.

In the embodiment, it is mainly described that when the user handwrites the character string (search character string) which should be used as the search key to search the handwritten document, the candidates of the search character string are displayed on the screen. At handwriting a character string other than the search character string, however, candidates of the character string may be displayed. Furthermore, candidates of figures, tables, etc. may be displayed other than the character string.

Since the processing of the embodiment can be implemented by a computer program, the same advantages as those of the embodiment can be easily implemented by installing the computer program in a computer via a computer-readable storage medium storing the computer program and executing the installed computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of an electronic apparatus, comprising:
    displaying a first area to input a search key for searching a handwritten document on a screen;
    detecting a n-th stroke (n is a positive integer) made on the first area of the screen;
    displaying the n-th stroke on the screen;
    searching, by a hardware processor, handwritings for a first handwriting candidate in response to an input of the n-th stroke, wherein at least part of the first handwriting matches first to the n-th strokes;
    displaying the first handwriting candidate in a second area;
    detecting a n+1-th stroke made on the first area of the screen;
    displaying the n+1-th stroke in the first area on the screen;
    searching, by the hardware processor, the handwritings for a second handwriting candidate in response to an input of the n+1-th stroke, wherein at least part of the second handwriting matches first to the n+1-th strokes;
    displaying the first handwriting candidate with a first priority and the second handwriting candidate with a second priority higher than the first priority in the second area of the screen;
    searching, by the hardware processor, the handwritten document for a first part of the handwritten document if the first handwriting candidate is selected by a user wherein the first part matches the first handwriting candidate; and
    searching, by the hardware processor, the handwritten document for a second part of the handwritten document, if the second handwriting candidate is selected by a user, wherein the second part matches the second handwriting candidate.

2. The method of claim 1, wherein the second handwriting candidate is displayed by at least one of a handwritten character string and a text corresponding to the second handwritten candidate.

3. The method of claim 2, wherein a user can select displaying the second handwriting candidate by the handwritten character string, displaying the second handwriting candidate by the text, or displaying the second handwriting candidate by both the handwritten character string and the text.

4. The method of claim 1, wherein if a plurality of second handwriting candidates are present, some of the second handwriting candidates are displayed on the screen in accordance with rank of each of the second handwriting candidates.

5. The method of claim 1, further comprising, if the second handwriting candidate is selected by a user, executing searching based on a handwritten character string or text corresponding to the second handwriting candidate.

6. An electronic apparatus, comprising:
    an input controller configured to receive first stroke data corresponding to a first handwritten stroke; and
    a display controller comprising a hardware processor configured to,
    display a first area to input a search key for searching a handwritten document on a screen;
    detect a n-th stroke (n is a positive integer) made on the first area of the screen;
    display the n-th stroke on the screen;
    search handwriting for a first handwriting candidate in response to an input of the n-th stroke, wherein at least part of the first handwriting matches first to the n-th strokes;
    display the first handwriting candidate in a second area
    detecting a n+1-th stroke made on the first area of the screen;
    display the n+1-th stroke in the first area on the screen;
    search the handwriting s for a second handwriting candidate in response to an input of the n+1-th stroke, wherein at least part of the second handwriting matches first to the n+1-th strokes;
    display the first handwriting candidate with a first priority and the second handwriting candidate with a second priority higher than the first priority in the second area of the screen;
    search the handwritten document for a first part of the handwritten document, if the first handwriting candidate is selected by a user, wherein the first part matches the first handwriting candidate; and
    search the handwritten document for a second part of the handwritten document, if the second handwriting candidate is selected by a user, wherein the second part matches the second handwriting candidate.

7. The apparatus of claim 6, wherein the second handwriting candidate is displayed by at least one of a handwritten character string and a text corresponding to the second handwritten candidate.

8. The apparatus of claim 7, wherein a user can select displaying the second handwriting candidate by the handwritten character string, displaying the second handwriting candidate by the text, or displaying the second handwriting candidate by both the handwritten character string and the text.

9. The apparatus of claim 6, wherein if a plurality of second handwriting candidates are present, some of the second handwriting candidates are displayed on the screen in accordance with rank of each of the second handwriting candidates.

10. The apparatus of claim 6, further comprising a searching controller configured to, if the second handwriting candidate is selected by a user, execute searching based on a handwritten character string or text corresponding to the second handwriting candidate.

11. A non-transitory computer-readable storage medium having stored thereon a computer program which is executable by a computer, the computer program comprising instructions capable of causing the computer to execute functions of:
- displaying a first area to input a search key for searching a handwritten document on a screen:
- detecting a n-th stroke (n is a positive integer) made on the first area of the screen;
- displaying the n-th stroke on the screen;
- searching handwritings for a first handwriting candidate in response to an input of the n-th stroke, wherein at least part of the first handwriting matches first to the n-th strokes;
- displaying the first handwriting candidate in a second area
- detecting a n+1-th stroke made on the first area of the screen;
- displaying the n+1-th stroke in the first area on the screen;
- searching the handwritings for a second handwriting candidate in response to an input of the n+1-th stroke, wherein at least part of the second handwriting matches first to the n+1-th strokes;
- displaying the first handwriting candidate with a first priority and the second handwriting candidate with a second priority higher than the first priority in the second area of the screen;
- searching the handwritten document for a first part of the handwritten document, if the first handwriting candidate is selected b a user wherein the first cart matches the first handwriting candidate; and
- searching the handwritten document for a second part of the handwritten document, if the second handwriting candidate is selected b a user wherein the second s art matches the second handwriting candidate.

12. The computer-readable storage medium of claim 11, wherein the second handwriting candidate is displayed by at least one of a handwritten character string and a text corresponding to the second handwritten candidate.

13. The computer-readable storage medium of claim 12, wherein a user can select displaying the second handwriting candidate by the handwritten character string, displaying the second handwriting candidate by the text, or displaying the second handwriting candidate by both the handwritten character string and the text.

14. The computer-readable storage medium of claim 11, wherein if a plurality of second handwriting candidates are present, some of the second handwriting candidates are displayed on the screen in accordance with rank of each of the second handwriting candidates.

15. The computer-readable storage medium of claim 11, causing the computer to further execute functions of, if the second handwriting candidate is selected by a user, executing searching based on a handwritten character string or text corresponding to the second handwriting candidate.

\* \* \* \* \*